US012630013B2

(12) United States Patent (10) Patent No.: US 12,630,013 B2
Yokoyama et al. (45) Date of Patent: May 19, 2026

(54) VEHICLE DISPLAY SYSTEM, VEHICLE DISPLAY METHOD, AND COMPUTER-READABLE NON-TRANSITORY STORAGE MEDIUM STORING VEHICLE DISPLAY PROGRAM

(71) Applicant: DENSO CORPORATION, Kariya-city (JP)

(72) Inventors: Shizuka Yokoyama, Kariya-city (JP); Takeshi Yamamoto, Kariya-city (JP); Kiyotaka Taguchi, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 44 days.

(21) Appl. No.: 18/469,446

(22) Filed: Sep. 18, 2023

(65) Prior Publication Data

US 2024/0001763 A1     Jan. 4, 2024

Related U.S. Application Data

(63) Continuation of application No. PCT/JP2022/013562, filed on Mar. 23, 2022.

(30) Foreign Application Priority Data

Mar. 30, 2021     (JP) ................................. 2021-057357

(51) Int. Cl.
| | |
|---|---|
| *B60K 35/00* | (2024.01) |
| *G06F 3/01* | (2006.01) |
| *G06F 3/14* | (2006.01) |
| *B60K 35/22* | (2024.01) |
| *B60K 35/28* | (2024.01) |

(Continued)

(52) U.S. Cl.
CPC .............. *B60K 35/00* (2013.01); *G06F 3/011* (2013.01); *G06F 3/1446* (2013.01); *B60K 35/22* (2024.01); *B60K 35/28* (2024.01); *B60K 35/29* (2024.01); *B60K 2360/1523* (2024.01);

(Continued)

(58) Field of Classification Search
None
See application file for complete search history.

(56) References Cited

U.S. PATENT DOCUMENTS

| | | | |
|---|---|---|---|
| 11,267,340 B2 * | 3/2022 | Nakajima | ......... B32B 17/10669 |
| 2007/0198183 A1 | 8/2007 | Morimoto et al. | |

(Continued)

FOREIGN PATENT DOCUMENTS

| | | |
|---|---|---|
| JP | 2006007867 A | 1/2006 |
| JP | 2015080994 A | 4/2015 |

(Continued)

*Primary Examiner* — Benjamin C Lee
*Assistant Examiner* — Emily J Frank
(74) *Attorney, Agent, or Firm* — Harness, Dickey & Pierce, P.L.C.

(57) ABSTRACT

By a vehicle display system, a vehicle display method, a computer-readable non-transitory storage medium storing a vehicle display method, information is displayed on a first display screen of a first display and a second display screen of a second display in a cooperation manner. The first display and the second display are arranged vertically. A target person who visually recognizes the first display screen and the second display screen is selected. A display aspect of the information on the first display screen or the second display screen is changed.

21 Claims, 16 Drawing Sheets

(51) Int. Cl.
  *B60K 35/29* (2024.01)
  *H04M 1/60* (2006.01)
(52) U.S. Cl.
  CPC .. *B60K 2360/182* (2024.01); *B60K 2360/344*
    (2024.01); *H04M 1/6075* (2013.01)

(56) References Cited

U.S. PATENT DOCUMENTS

| | | | |
|---|---|---|---|
| 2017/0305342 A1 | 10/2017 | Tomioka | |
| 2017/0322760 A1* | 11/2017 | Soh | G06F 3/1446 |
| 2020/0286450 A1* | 9/2020 | Furuya | G06T 13/80 |
| 2021/0323406 A1* | 10/2021 | So | B60K 35/60 |
| 2021/0354559 A1* | 11/2021 | Kim | B60W 40/08 |
| 2021/0389009 A1* | 12/2021 | Kwak | B60H 1/00985 |
| 2023/0401025 A1* | 12/2023 | Liu | B60K 35/29 |
| 2024/0294115 A1* | 9/2024 | Komatsu | B60R 1/25 |

FOREIGN PATENT DOCUMENTS

| | | |
|---|---|---|
| JP | 2016091055 A | 5/2016 |
| JP | 2019101755 A | 6/2019 |

* cited by examiner

FIG. 5

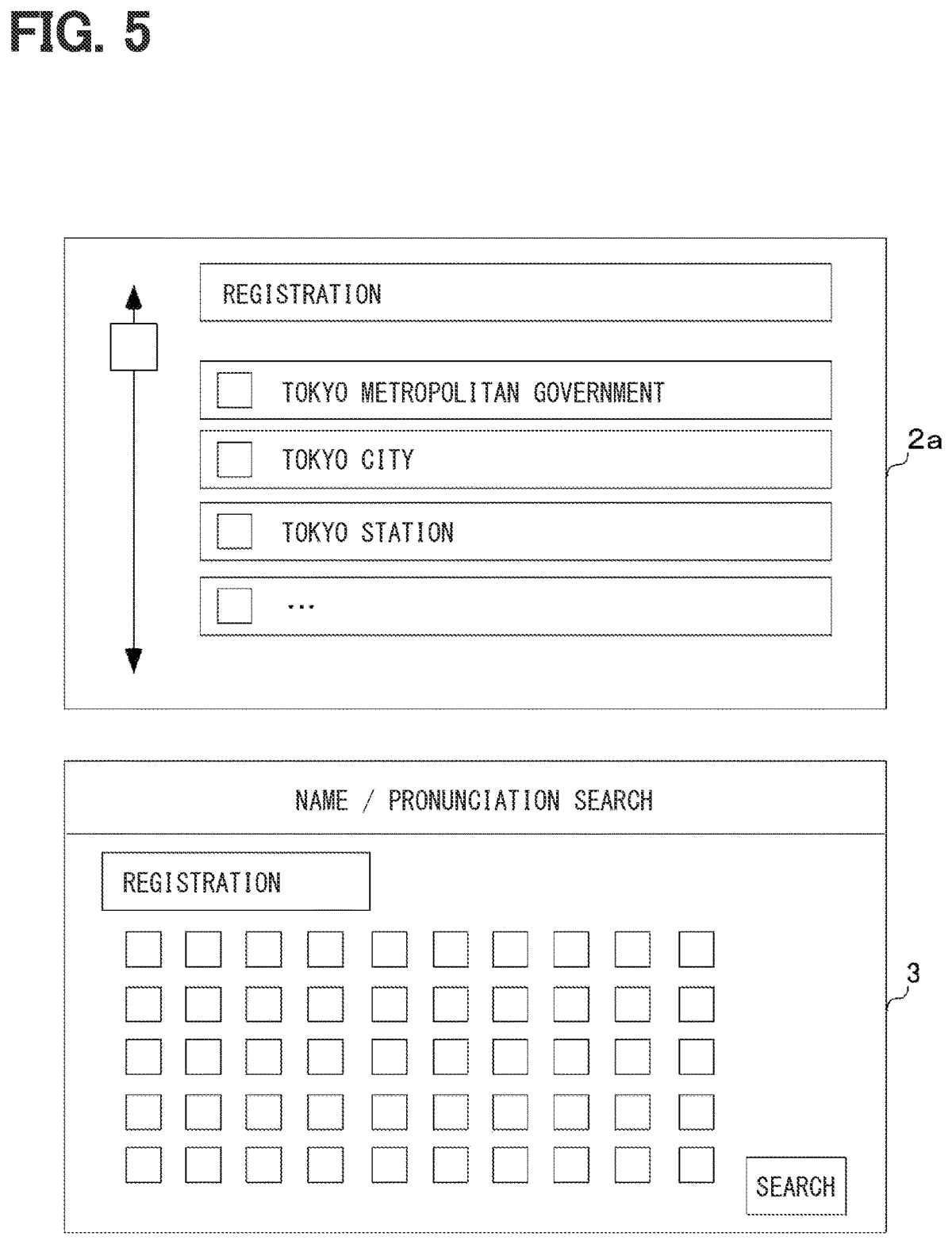

REGISTRATION

☐ TOKYO METROPOLITAN GOVERNMENT

☐ TOKYO CITY

☐ TOKYO STATION

☐ ...

2a

NAME / PRONUNCIATION SEARCH

REGISTRATION

☐ ☐ ☐ ☐ ☐ ☐ ☐ ☐ ☐ ☐
☐ ☐ ☐ ☐ ☐ ☐ ☐ ☐ ☐ ☐
☐ ☐ ☐ ☐ ☐ ☐ ☐ ☐ ☐ ☐
☐ ☐ ☐ ☐ ☐ ☐ ☐ ☐ ☐ ☐
☐ ☐ ☐ ☐ ☐ ☐ ☐ ☐ ☐ ☐

SEARCH

3

VEHICLE DISPLAY SYSTEM, VEHICLE DISPLAY METHOD, AND COMPUTER-READABLE NON-TRANSITORY STORAGE MEDIUM STORING VEHICLE DISPLAY PROGRAM

CROSS REFERENCE TO RELATED APPLICATIONS

The present application is a continuation application of International Patent Application No. PCT/JP2022/013562 filed on Mar. 23, 2022, which designated the U.S. and claims the benefit of priority from Japanese Patent Application No. 2021-057357 filed on Mar. 30, 2021. The entire disclosures of all of the above applications are incorporated herein by reference.

TECHNICAL FIELD

The present disclosure relates to a vehicle display system, a vehicle display method, and a computer-readable non-transitory storage medium storing a vehicle display program.

BACKGROUND

Conventionally, a plurality of displays are arranged in a vehicle, and these displays show various information about the vehicle. In a comparative example, a stereoscopic image is generated, and can be viewed from a specific seat.

Further, a technology has also been proposed for displaying a warning image at the line of sight of the driver. Furthermore, when a driver observes operation contents on a central display while operating a steering switch, the driver performs distracted driving. Therefore, a technology has been proposed in which the display is performed on the dashboard at a position that is close to an operation unit and faces the driver seat. Furthermore, a technology has also been proposed for shifting the display position according to a traveling situation.

SUMMARY

By a vehicle display system, a vehicle display method, a computer-readable non-transitory storage medium storing a vehicle display method, information is displayed on a first display screen of a first display and a second display screen of a second display in a cooperation manner. The first display and the second display are arranged vertically. A target person who visually recognizes the first display screen and the second display screen is selected. A display aspect of the information on the first display screen or the second display screen is changed.

BRIEF DESCRIPTION OF DRAWINGS

The above and other features and advantages of the present disclosure will become more apparent from the following detailed description made with reference to the accompanying drawings.

FIG. 5 is a diagram showing an example of image content to be displayed on a first display screen of a first display and a second display screen of a second display.

DETAILED DESCRIPTION

Figure 1:
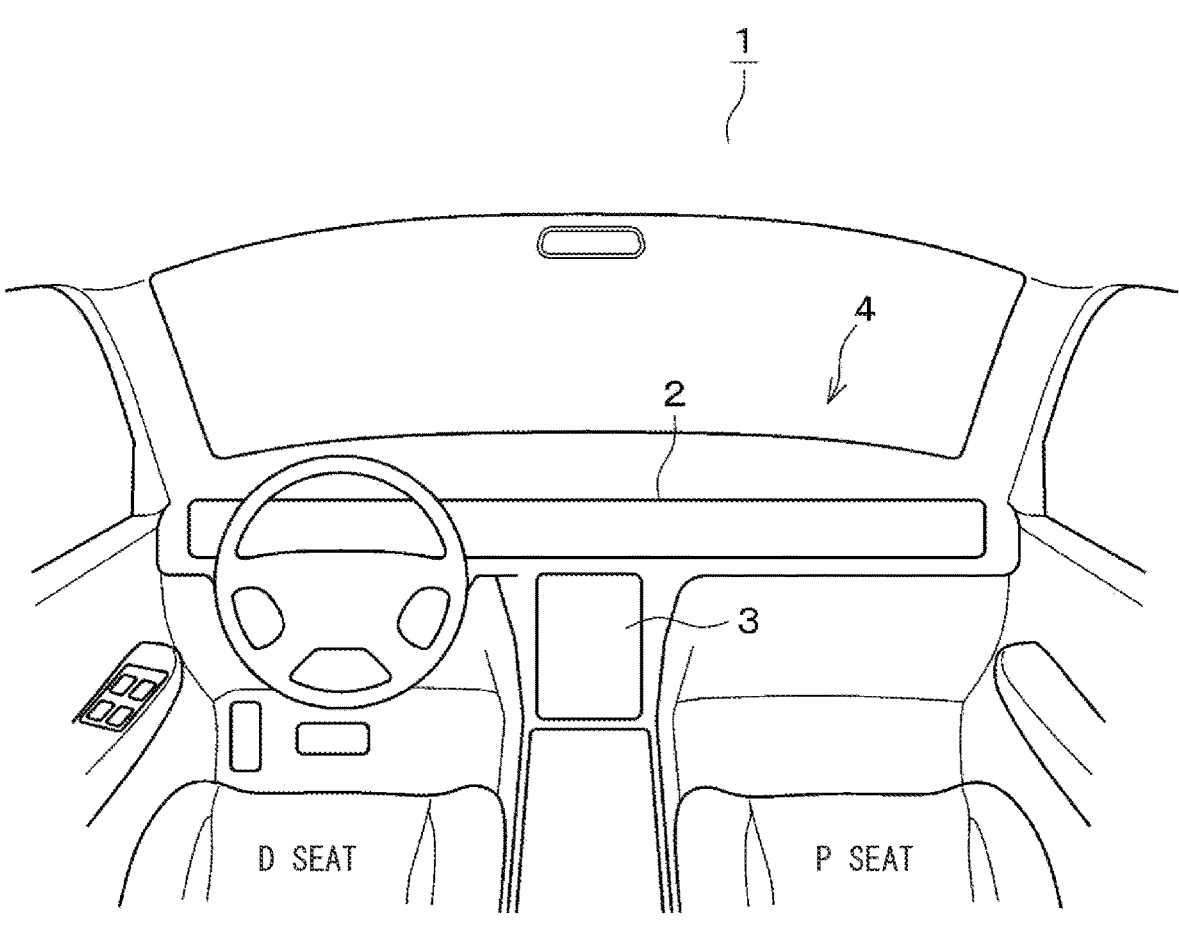
FIG. 1 is an external view of a vehicle display system according to a first embodiment.

In recent years, a technology has been proposed for increasing a display area by providing a plurality of displays vertically in the center of a cockpit system, and providing information by linking these displays. When a plurality of displays are spaced apart, it becomes difficult an occupant sitting in the driver seat or the front passenger seat to grasp that the provided displays perform the display in cooperation with each other in the vertical direction.

One example of the present disclosure provides a vehicle display system, a vehicle display method, and a computer-readable non-transitory storage medium storing a vehicle display program capable of causing an occupant to grasp contents displayed in a cooperation manner by a plurality of displays provided in a vertical direction without discomfort.

According to example embodiments, a vehicle display system, a vehicle display method, or a computer-readable non-transitory storage medium storing a vehicle display program is used for displaying information on a first display screen of a first display and a second display screen of a second display in a cooperation manner, wherein the first display and the second display are arranged vertically. According to the example embodiments, a target person who visually recognizes the first display screen and the second display screen is selected among at least one occupant. A display aspect of the information on the first display screen or the second display screen is changed for facilitating recognition, by the target person, of the information cooperatively displayed on the first display screen and the second display screen. Thereby, the occupant can grasp the cooperation display of the plurality of displays arranged in a vertical direction without uncomfortable recognition.

Hereinafter, several embodiments of a vehicle display system 1, a vehicle display method, and a vehicle display program will be described below with reference to the drawings. In the following description, the same reference numerals are given to substantially the same portions according to the embodiments.

First Embodiment

As shown in FIG. 1, in a first embodiment, the vehicle display system 1 includes a cockpit system 4 including a plurality of display devices such as a pillar-to-pillar display 2 and a center display 3. However, the number, the arrangement, or the configuration of the display devices is merely an example, and the disclosure is not limited thereto. Hereinafter, the pillar-to-pillar display 2 is also referred to as a P-to-P display 2.

Figure 2:
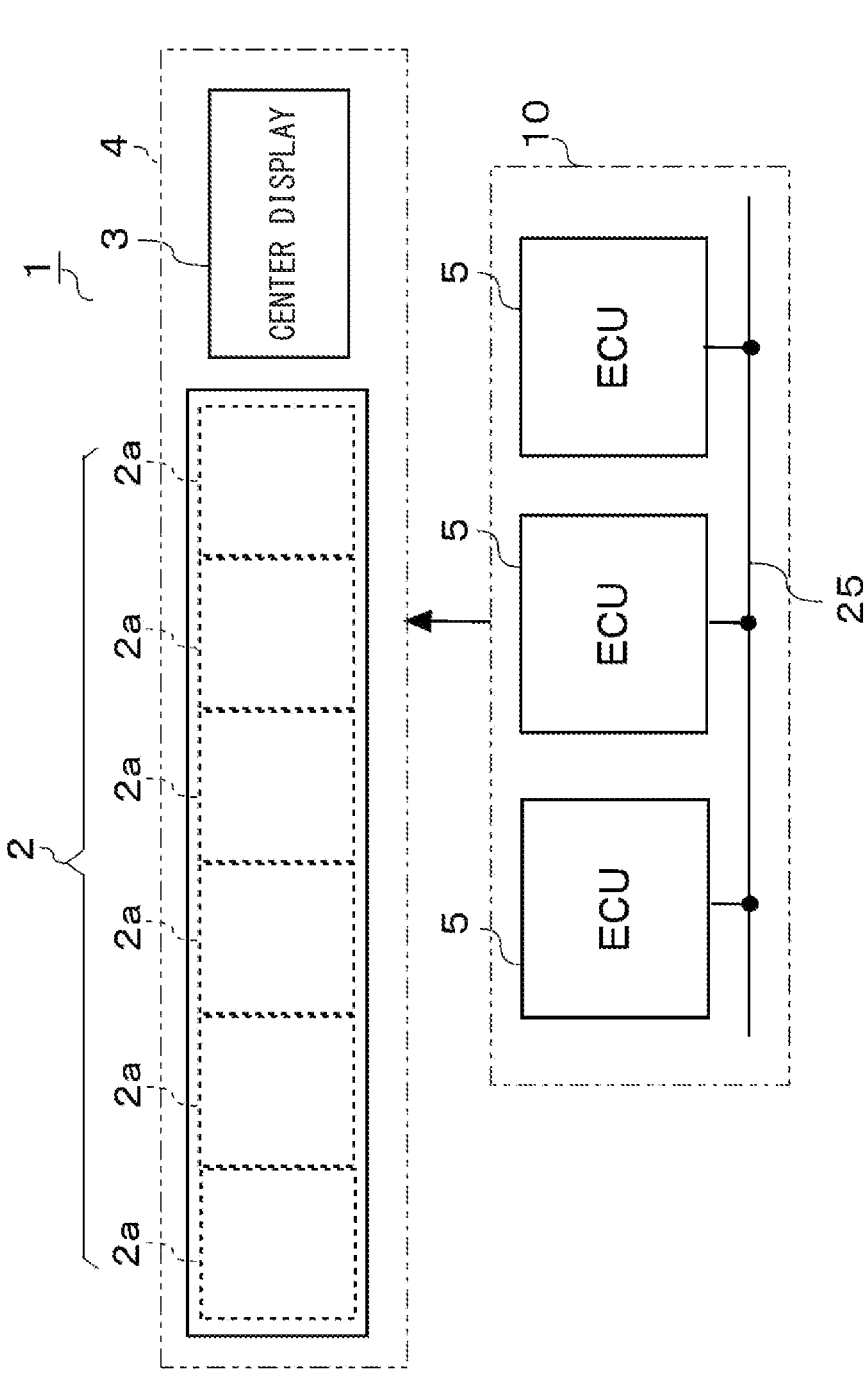
FIG. 2 is an explanatory diagram showing a configuration example of a display and a control example.

As shown in FIG. 2, the P-to-P display 2 is configured such that a plurality of displays 2a are arranged side by side to become horizontally long. Each display 2a of the P-to-P display 2 has a liquid crystal display or an organic EL display, and is a large display provided on a dashboard between the left pillar and the right pillar of the vehicle. The P-to-P display 2 can display various image contents such as meter images, images captured by a peripheral camera 23, entertainment images such as still images and moving images, and map images in the peripheral of a current position in full graphic display.

In this case, the meter image is displayed in a specific display 2a among the P-to-P displays 2 within a driver vision field during normal driving. In a case of automated driving, this is not the case. In addition, since the P-to-P display 2 is configured to be long in a lateral direction, the display contents can be confirmed not only by the driver and the occupant in the front seats but also by the occupant in the rear seats. On the other hand, the center display 3 has, for example, a liquid crystal display or an organic EL display, and is installed below the P-to-P display 2 between the driver seat and the passenger seat. The center display 3 is provided in the vicinity of a center console so that both the driver and the occupant in the front seats can easily view it, and can display various contents. An operation panel 21 is formed on the center display 3, and it is possible to select contents to be displayed on the P-to-P display 2, operate air conditioning, operate audio, and perform input operations for navigation functions.

The P-to-P display 2 is vertically arranged with the center display 3 and is spaced apart from the center display 3. The vertical direction may mean a height direction of the vehicle. When two screens are installed in the vertical direction, it is possible to increase the display area that can be visually recognized by the occupant at one time. The expression of "visually recognize" may be also referred to as an expression of "view". Further, in the cockpit system 4, the display screen of each display 2a of the P-to-P display 2 is installed so as to be positioned further outward than the display screen of the center display 3. Here, the outward direction means that the display screen of the P-to-P display 2 is positioned close to a vehicle exterior with respect to the vehicle occupant such as the driver, in other words, means that, in a traveling direction of the vehicle, the display screen of the P-to-P display 2 is in front of that of the center display 3.

Further, as shown in FIGS. 1 and 2, a large number of ECUs 5 are configured in the vehicle and connected to a vehicle interior network 25. The ECU 5 includes a display system ECU, a periphery monitoring system ECU, a drive control system ECU, and a DCM that communicates with the outside of the vehicle. The DCM is the abbreviation for data communication module. The travel control system ECU includes a well-known vehicle control ECU, an engine control ECU, a motor control ECU, a brake control ECU, a steering control ECU, an integrated control ECU, and the like. The travel control system ECU includes an automated driving ECU. The automated driving ECU is also referred to as an autonomous driving ECU (electric control unit).

When the automated driving ECU receives an automatic control signal, it drives driving actuators to execute corresponding predetermined levels of driving assistance and automated driving. For example, the driving assistance with level I includes an automatic braking operation to avoid collisions with obstacles, a follow-up driving operation that follows the preceding vehicle, and a lane-deviation prevention traveling operation that controls the vehicle so that it does not stray from traveling lanes on both sides. The automated driving with level II can use the driving assistance with level I, and execute an automated driving mode that causes the vehicle to perform automated driving under specific conditions, automatically pass over a slow vehicle when the slow vehicle exists in an expressway, for example, and causes the vehicle to automatically merge onto or come out the road in the expressway. Here, in the automated driving with level II, the driver is obliged to monitor the automated driving operation. In the automated driving with level Ill and above, the system performs all driving tasks while being monitored by the system. However, the detailed description will be omitted.

Each ECU 5 mainly includes a microcomputer having a processor, various storages 6 such as a cache memory, a RAM, and a ROM, an I/O interface, and a bus connecting them. Each ECU 5 is communicably connected to other ECUs 5 provided in the vehicle through the communication controller 7 and the vehicle interior network 25.

In the present embodiment, as shown in FIG. 2, the plurality of display system ECUs 5 constitute an HCU as the vehicle device 10, and share a processing capacity of physical resources inside the display system ECUs 5 to cause the P-to-P display 2 and the center display 3 to execute a display process. The HCU is an abbreviation for Human Machine Interface Control Unit and indicates an information presentation control device. Although the ECU 5 of the display system is also connected to the vehicle interior network 25, the ECU 5 may be connected by a dedicated line. The storage 6 is a non-transitory tangible storage medium for non-transitory storage of computer readable programs and data. The non-transitory tangible storage medium is implemented by a semiconductor memory or the like.

Figure 3:
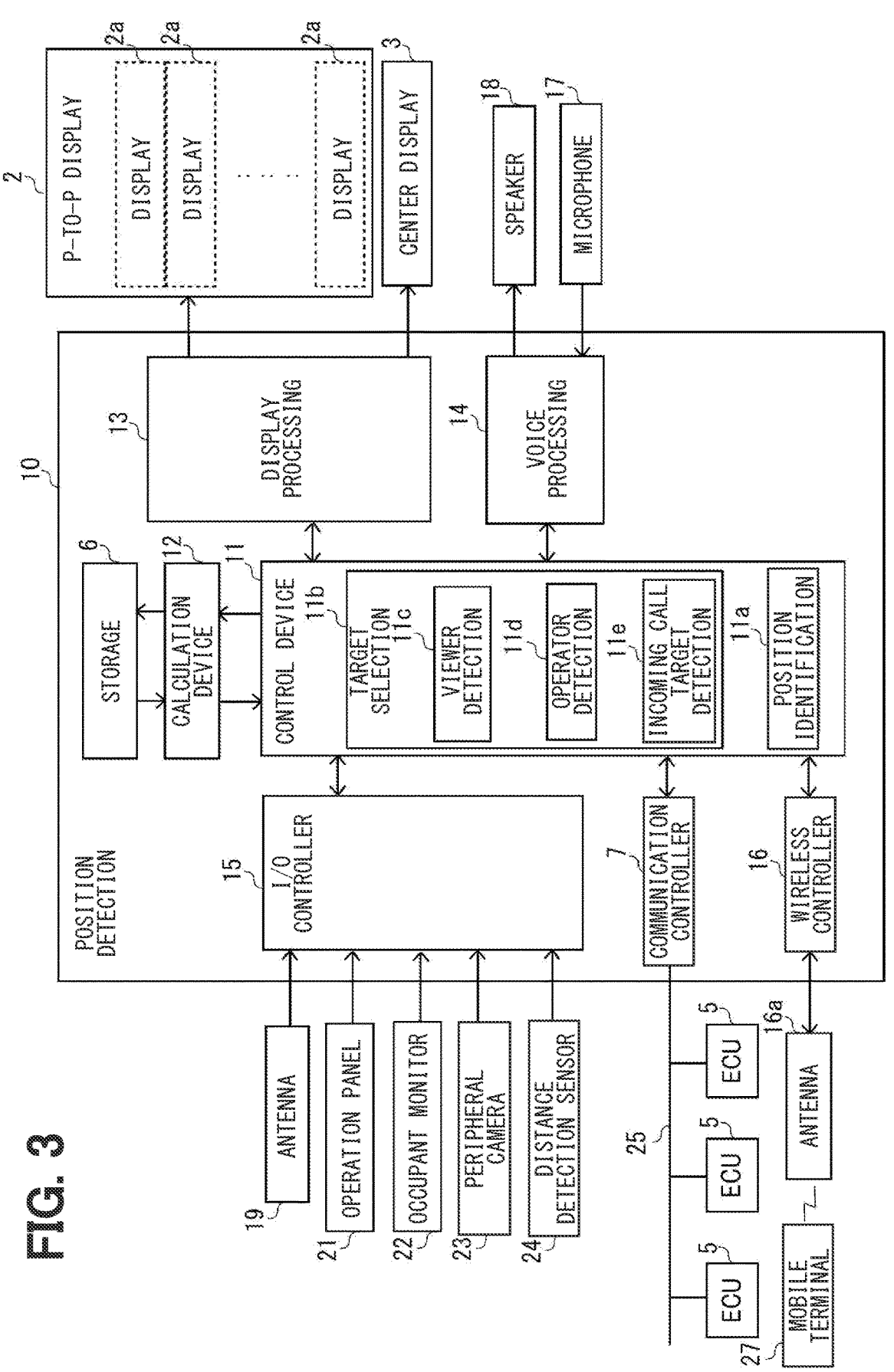
FIG. 3 is a block diagram schematically showing the vehicle display system.

As shown in FIG. 3, the vehicle device 10 includes a control device 11, a calculation device 12, a storage 6, a display processing unit 13, a sound processing unit 14, an I/O controller 15 that manages input or output from various devices, a communication controller 7 for managing communication with another ECU 5, and a wireless controller 16 configured by connecting an antenna 16a to enable wireless connection with another mobile terminal 27 by wireless LAN or Bluetooth (registered trademark). Here, a feature of inputting/outputting of main components through the I/O control unit 15 will be described. However, alternatively, the inputting into and outputting from other ECUs 5 such as the periphery monitoring ECU and the traveling control ECU via the vehicle interior network 25 may be performed.

The wireless controller 16 establishes a communication link with a mobile terminal 27 carried by a vehicle occupant.

The vehicle device 10 waits for an incoming call to the mobile terminal 27, and when the mobile terminal 27 receives an incoming call from the other party and answers the incoming call, the information processing device 10 communicates with the other party through a speaker 18 and a microphone 17 via the mobile terminal 27. Further, the vehicle device 10 can recognize the voice input through the microphone 17.

The calculation device 12 calculates a display area to be displayed on the display screens of the P-to-P display 2 and the center display 3 for displaying the contents of images and characters stored in the storage 6, based on the control of the control device 11, and displays the images and characters on any area of the display screens of the P-to-P display 2 or the center display 3. Also, the calculation device 12 calculates a target area for overlapping the display, and outputs the display area to the display processing unit 13 through the control device 11 together with the content of the image and characters.

Under the control of the control device 11, the display processing unit 13 displays contents such as images, sentences, and characters in the above-described display areas in the display screens of the P-to-P display 2 and the center display 3. The calculation process of the calculation device 12 may be executed by any one of the control device 11, the calculation device 12 and the display processing unit 13. Thereby, on the display screens of the displays 2 and 3, the contents such as images, sentences, and characters can be overlapped and displayed for each display layer. Under the control of the control device 11, the sound processing unit 14 receives a reception voice input from the microphone 17 and outputs a transmission voice from the speaker 18. When the sentence content and the character content are input from the control device 11, the sound processing unit 14 converts them into voice, reads them out through the speaker 18, and outputs them.

A position detection unit 19 detects a position with high accuracy using a well-known GNSS receiver such as GPS (not shown) and an inertial sensor such as an acceleration sensor or a gyro sensor. The position detection unit 19 outputs a position detection signal to the control device 11 through the I/O control unit 15. A position identification unit 11a of the control device 11 implements a function as an ADAS locator that sequentially measures the current position of the vehicle with high accuracy based on the map information input from the map data input device and the position detection signal of the position detection unit 19. The ADAS is an abbreviation for advanced driver assistance systems. In this case, the vehicle position is represented in a coordinate system using latitude and longitude. In this coordinate system, for example, x-axis indicates longitude and y-axis indicates latitude It should be noted that the specifying of the vehicle position may be executed in various manners in addition to the above-described method. For example, the position of the vehicle may be specified based on travelling distance information obtained from the detection result by a vehicle speed sensor mounted on the subject vehicle. The control device 11 can perform a so-called navigation process based on the current position of the subject vehicle.

The operation panel 21 is a touch panel configured on the center display 3, and the I/O control unit 15 receives an operation input from the occupant and outputs the operation input to the control device 11. The control device 11 executes control based on operation signals from the operation panel 21.

An occupant monitor 22 detects the state of the occupant in the vehicle or the operation state. The occupant monitor 22 is configured using, for example, a power switch, a passenger state monitor, a turn switch, an autonomous control switch, and the like, and outputs sensor signals to the control device 11. The occupant monitor 22 may include a steering sensor that detects whether the steering wheel is being gripped or steered by the driver, a seating sensor that detects whether the driver is seated, an accelerator pedal or brake pedal depression sensor, and the like.

The power switch is turned on by a user in the vehicle compartment in order to start the internal combustion engine or the electric motor, and outputs a signal corresponding to the operation. The occupant state monitor includes a camera that detects the state of the occupant in the D seat or the P seat by photographing the state of the occupant with an image sensor and outputs an image signal. The occupant state monitor of the driver is called DSM. The DSM may be also referred to as a Driver Status Monitor. The occupant state monitor obtains an image signal obtained by irradiating the face of the driver with near-infrared light and capturing an image, analyzes the image as necessary, and outputs the signal to the control device 11. These occupant state monitors are used to detect the state of the occupant user such as the driver, especially during the driving assistance operation or the automated driving operation. A turn switch is turned on by an occupant in the vehicle compartment to activate a direction indicator of the subject vehicle, and outputs a turn signal for turning right or left according to the operation.

The automatic control switch outputs an automatic control signal in response to the occupant operation when the occupant in the vehicle compartment executes an on-operation in order to command an autonomous control of the driving state of the vehicle. The control device 11 can determine the behavior of the occupant of the vehicle, for example, in which direction the line of sight is directed, based on the sensor signal from the occupant monitor 22. Further, the control device 11 can also input the operation state of the power switch, the operation state of the direction indicator, the command information of the automatic control of the vehicle, and the like.

The peripheral camera 23 provides a periphery monitor sensor such as a front camera that images the front of the vehicle, a back camera that images the rear of the vehicle, a corner camera that images the front side and the rear side of the vehicle, a side camera that images the side of the vehicle. These sensors output each image signal of the front guide monitor, the back guide monitor, the corner view monitor, and the side guide monitor to the control device 11 through the I/O control unit 15, to store as respective imaging signals. The communication controller 7 is connected to the vehicle interior network 25 such as CAN or LIN, and controls data communication with other ECUs 5.

A distance detection sensor 24 for detecting the distance to an obstacle is installed in the vehicle as a periphery monitor sensor. The distance detection sensor 24 includes a clearance sonar, a LiDAR, a radar using a millimeter wave or a quasi-millimeter wave, and the like, and detects vehicles, people, animals, fallen objects on the road, guardrails, curbs, trees, and the like approaching near the front of the vehicle, the front side of the vehicle, the rear side of the vehicle, the rear of the vehicle, or the side of the vehicle. It can also detect the azimuth to the obstacle and the distance to the obstacle. In addition, with the above-mentioned periphery monitor sensor, it is possible to detect road markings such as traffic lane markings, stop lines, and pedestrian crossings painted on the road around the subject vehicle, traffic signs such as a "stop" sign painted on the road, and a stop line painted at a boundary of an intersection.

Figure 4:
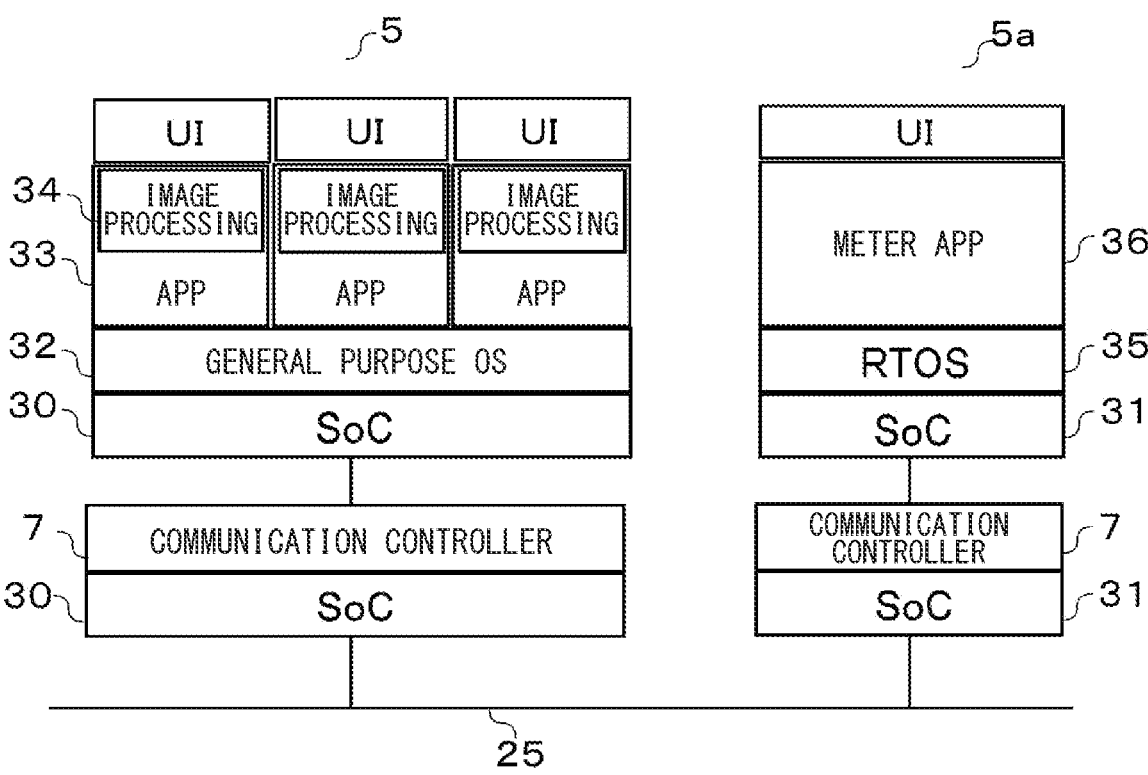
FIG. 4 is a configuration diagram schematically showing hardware and software.

FIG. 4 shows an example of the hardware and software configuration of the vehicle device 10. SoCs 30 and 31 are mounted on ECUs 5 and 5a, respectively, and the above-described microcomputers are equipped in the mounted SoCs 30 and 31, respectively. The microcomputers equipped in the SoCs 30 and 31 of the ECU 5 are configured to operate various applications (hereinafter abbreviated as apps) on a pre-installed general-purpose OS 32, such as Linux OS (Linux is a registered trademark). The SoC is an abbreviation for System On Chip.

An application 33 includes an image processing application 34 and other applications. A processor equipped in the SoC 30 executes a drawing process on the display screen of each display 2a of the P-to-P display 2 in response to a drawing request from the image processing application 34.

Since the ECU 5a is provided for drawing a meter, the symbol 5a is attached. On the microcomputer equipped in the SoC 31 of the ECU 5a, a real-time OS 35 capable of processing with higher real-time performance than the general-purpose OS 32 is installed, and a meter application 36 is operated on the real-time OS 35. Note that the following description may focus on the applications 33 such as the image processing application 34 and the meter application 36.

The meter application 36 notifies the user of vehicle speed, rotation speed, warnings, and the like, and mainly shows an image content displayed in a display area of a specific display 2a for the P-to-P display 2. For example, the meter application 36 draws the image content such as a speedometer, a tachometer, a shift range position, or a warning light. The speedometer includes a speed image whose display needs to be updated in real time to show changes in the speed of the vehicle. Similarly, the tachometer is also included in a meter image a, as the display needs to be updated in real time to show changes in the number of rotations. The communication controller 7 communicates with other ECUs 5 through the vehicle interior network such as CAN and LIN.

A content to be drawn by the meter application 36 can also be displayed on another display, for example, the center display 3. The content to be drawn by the meter application 36 is required to have relatively more real-time performance than the content drawn by other applications.

The application 33 includes a navigation application and the like. The navigation application implements a navigation function and mainly shows image contents such as a map image d displayed on the P-to-P display 2 and a navigation screen including the current position of the vehicle.

The application 33 also includes an image synthesizing application. The image synthesizing application is an application for specifying sizes and types of various image contents to be displayed on the display device, synthesizing images of the image contents in one frame, and outputting the synthesized mixed image on each display 2a of the P-to-P display 2. The image synthesizing application implements a function as an image synthesizing unit, also called a compositor, and a function as an image output unit.

The application 33 also includes a detection application. The detection application detects gestures of the occupants in the vehicle based on the imaging signal from the occupant monitor 22, and detects finger operations and line of sight. Further, the detection application detects the operator of the touch panel of the operation panel 21, and detects whether there is an incoming call by wirelessly communicating with the mobile terminal 27 carried by the vehicle occupant. The detection application implements functions as a viewer detection unit 11c, an operator detection unit 11d, and an incoming call target detection unit 11e.

The application 33 also includes a selection application. The selection application is an application that selects a target person who visually recognizes the P-to-P display 2 and the center display 3, from among at least one of the occupants in the vehicle detected by the detection application. The selection application implements the function of a target selection unit 11b.

Among the applications 33 and 36, the application that draws the image content is assigned a display layer for drawing the image content. These display layers are secured on the storage 6 in a size capable of drawing necessary image contents.

Also, the image content to be displayed on each of the display 2 and the display 3 can be animated. Here, the animation operation is a display aspect in which a position and a size of an image indicating the content gradually change, the image rotates, the user interface moves as a whole along with a swipe operation, the image gradually fades in or fades out, the color of the image changes, and the like.

For example, a meter image such as a speedometer and a tachometer, or a map image, or the like are image contents whose size and position change depending on a display mode or the display device 2 or 3 that is a display destination. However, the animation operation is not limited thereto, and any animation operation in which the display aspect changes continuously or intermittently from a certain time point is included.

The control device 11 shown in FIG. 3 implements various functions by executing various applications 33 and 36 stored in the storage 6. In the present embodiment, the control device 11 implements the navigation function by executing the navigation application stored in the storage 6. Further, by executing the detection application stored in the storage 6, the control device 11 functions as the viewer detection unit 11c that determines, based on the monitor signal of the occupant monitor 22, whether there are occupants sitting in the D seat, the P seat, and the rear seat in the vehicle, and detects the line of sight of occupants sitting in the D seat, the P seat, and the rear seat.

Further, the control device 11 implements the function of the operator detection unit 11d that detects which of the occupants in the vehicle is the target person who operates the operation panel 21 by executing the detection application. In addition, by executing the detection application, the control device 11 implements the function of the incoming call target detection unit 11e that detects a target person of an incoming call among the mobile terminals 27 owned by the occupants of the vehicle when receiving the incoming call sent from the outside through the wireless controller 16. Further, by executing the selection application, the control device 11 implements the function of the target selection unit 11b that selects the target person including at least one of the occupants in the vehicle who views both the P-to-P display 2 and the center display 3.

The display processing unit 13 changes the display position of the image content to be displayed on the center display 3 or the P-to-P display 2, or changes the image content based on the selection result of the target person selected by the target selection unit 11b. Then, the display processing unit 13 changes information display aspect in the cooperation display on the first display screen of each display 2a of the P-to-P display 2 and the second display screen of the center display 3 in accordance with the target person so that the selected target person can easily recognize the information. It is desirable that the display processing unit 13 changes the display aspect so that the information can be visually recognized by connecting the information in the vertical direction according to the target person.

The use aspects of the P-to-P display 2 and the center display 3 will be described with reference to FIG. 5 and FIG. 6. When using the navigation function, the occupant taps the operation panel 21 installed on the center display 3 to set the destination.

As shown in FIG. 5, the control device 11 receives a destination setting instruction from the occupant by executing the navigation application. Then, the display processing unit 13 causes the screen of the center display 3 to display a keyboard in a pseudo manner, and causes the specific display 2a of the P-to-P display 2 to display the result of prediction conversion. Thereby, it is easier for the occupant to grasp the prediction conversion result while grasping the details of the operation, so that it is possible to perform the operation smoothly without rework. In addition, it is possible to predict the search results even while characters are being input, and perform searches with minimal input without rework.

Figure 6:
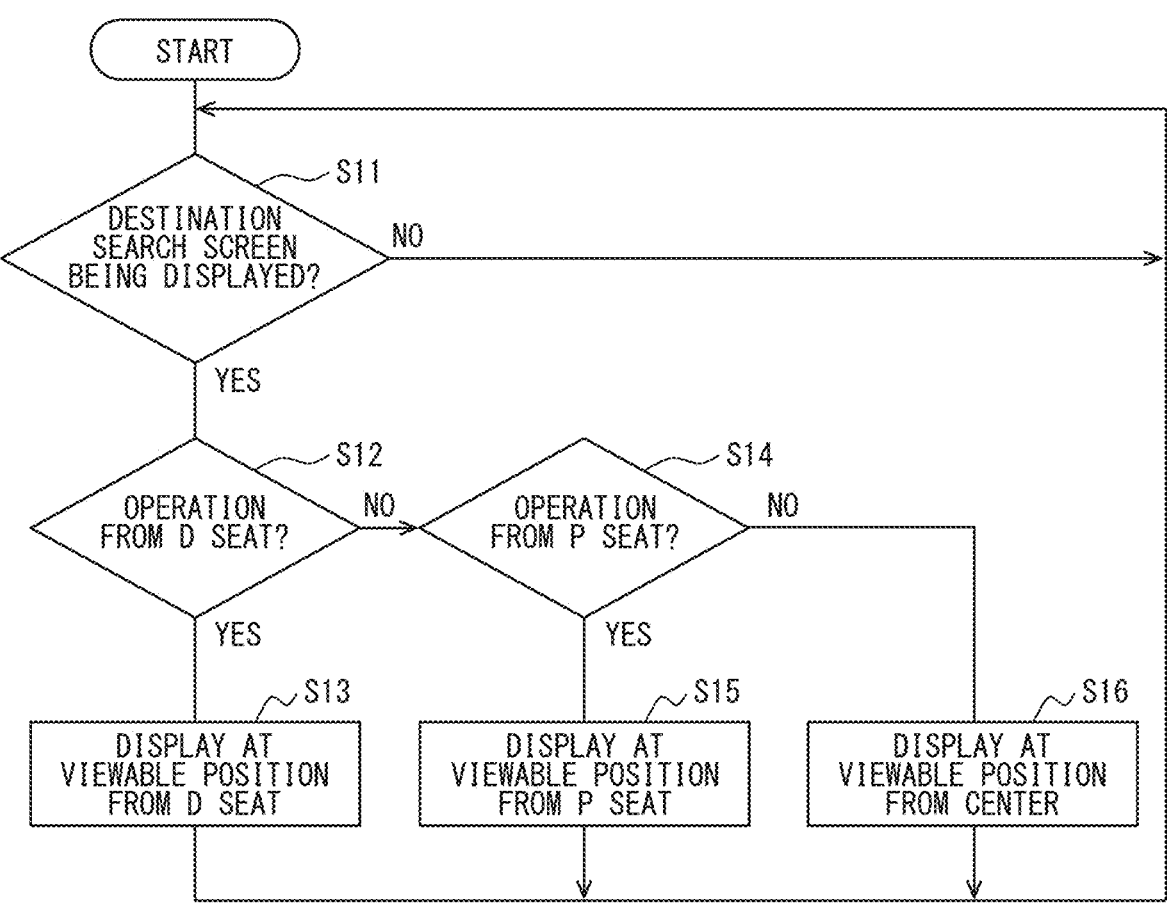
FIG. 6 is a flowchart schematically illustrating processes.

Further, when, in response to the execution of the navigation application by the control device 11, the display processing unit 13 displays a destination search screen on the two screens of the center display 3 and the P-to-P display 2 in the vertical direction in S11 of FIG. 6, it is determined whether the operation was performed from the D seat or from the P seat in S12 and S14 of FIG. 6.

In a case of executing the navigation application by the control device 11, when the viewer detection unit 11c detects the line of sight from the D seat or the operator detection unit 11d detects that an operation was performed from the D seat, the controller 11 determines that result is YES in S12. In S13, the display processing unit 13 displays the information at a position where information can be visually recognized from the viewpoint of the D seat when the information is provided to the D seat. At this time, it is desirable that the display processing unit 13 alternatively selects one or more displays from among the plurality of displays 2a that constitute the P-to-P display 2 and causes the display to be displayed. Thereby, the display processing unit 13 becomes unnecessary to display one image content across the plurality of displays 2a. Therefore, the occupant recognition becomes easier.

Figure 7:
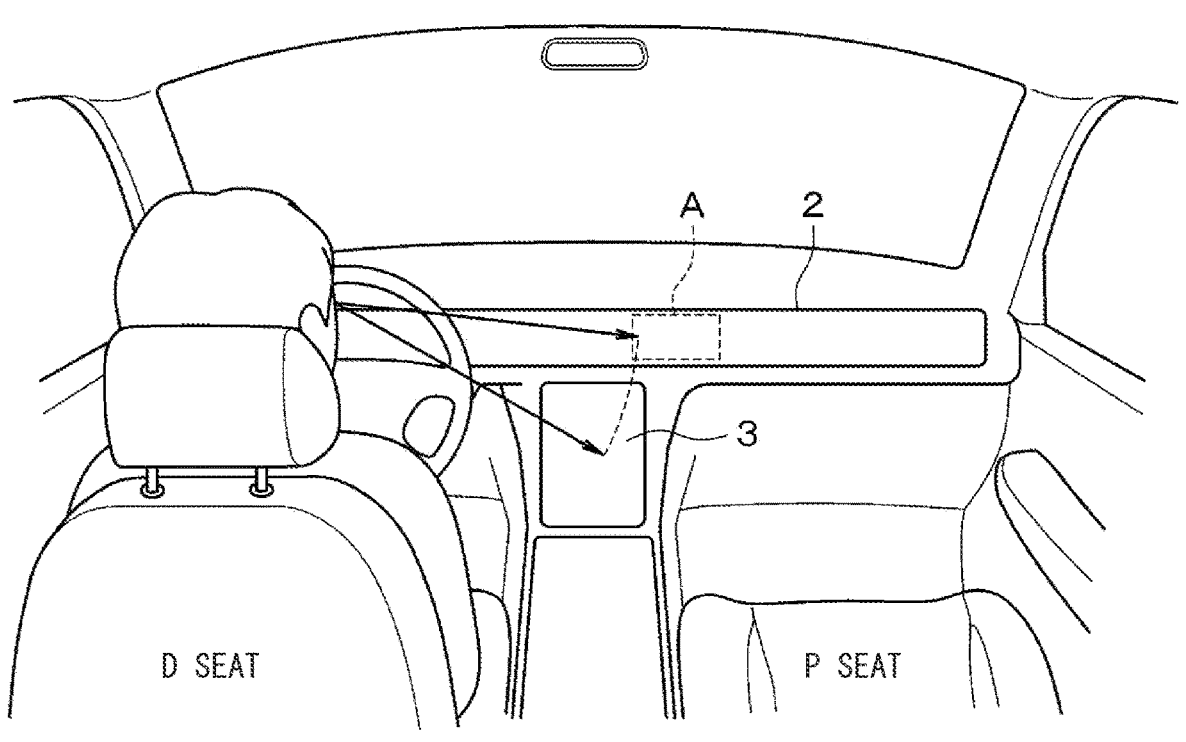
FIG. 7 is an explanatory diagram showing a display area that can be and visually recognized from a driver seat in a cooperation manner in a vertical direction.

The display processing unit 13 changes the information display aspect by moving the display screen to a position close to the P seat from the center in the P-to-P display 2 as shown by a display screen A of FIG. 7, when the display screen of the P-to-P display 2 is at the position closer to the vehicle exterior than the display screen of the center display 3. As a result, the image contents can be displayed at positions where they can be visually recognized in the vertical direction from the viewpoint from the D seat. Thereby, it becomes easier to inform the driver sitting in the D seat that the screen displays of the two displays 2 and 3 arranged in the vertical direction are placed in the cooperation manner.

Further, in a case of executing the navigation application by the control device 11, when the line of sight from the P seat or an operation from the P seat is detected, the controller 11 determines that result is YES in S14. In S15, the display processing unit 13 displays the information at a position where information can be visually recognized from the viewpoint of the P seat when the information is provided to the P seat.

Figure 8:
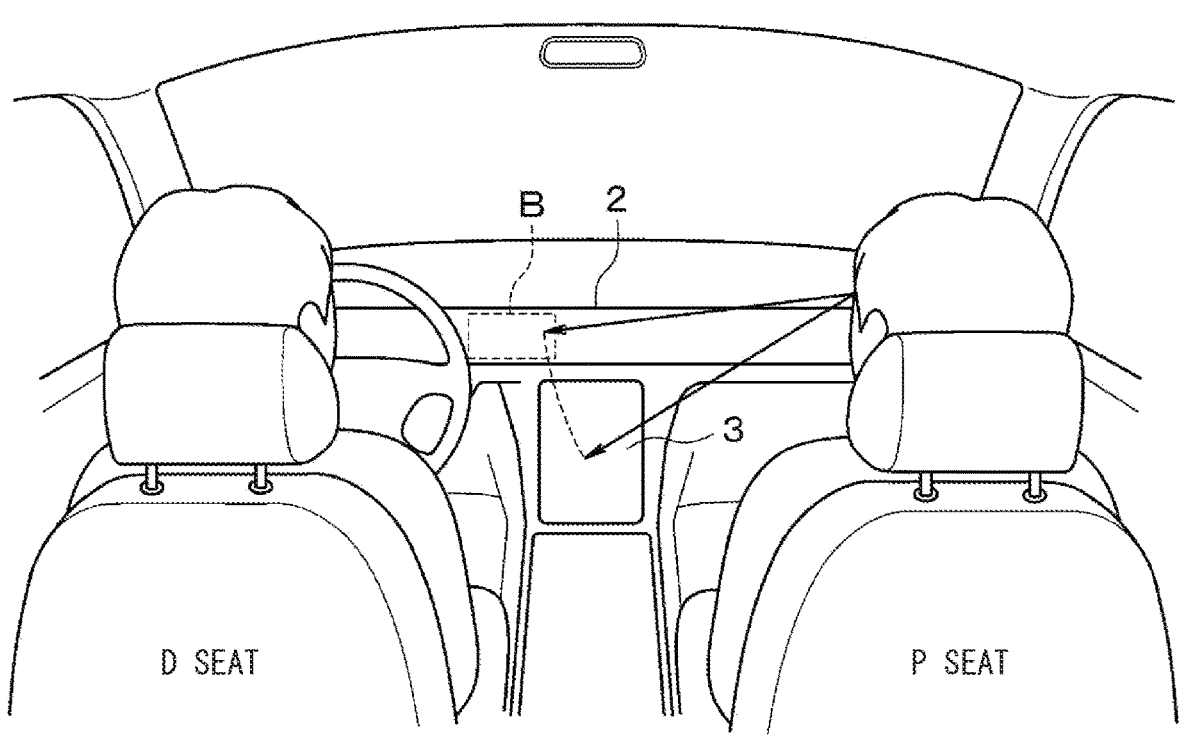
FIG. 8 is an explanatory diagram showing a display area that can be and visually recognized from an occupant seat in the cooperation manner in the vertical direction.

The display processing unit 13 moves the display to a position close to the D seat from the center in the P-to-P display 2 as shown by a display screen B of FIG. 8, when the display screen of the P-to-P display 2 is at the position closer to the vehicle exterior than the display screen of the center display 3. Thereby, the display processing unit 13 displays the image contents at a position that enables recognition of the vertically arranged image contents from the viewpoint from the P seat. Thereby, it becomes easier to inform the occupant in the P seat that the display screens of the two displays 2 and 3 arranged in the vertical direction are displayed in cooperation with each other.

Figure 9:
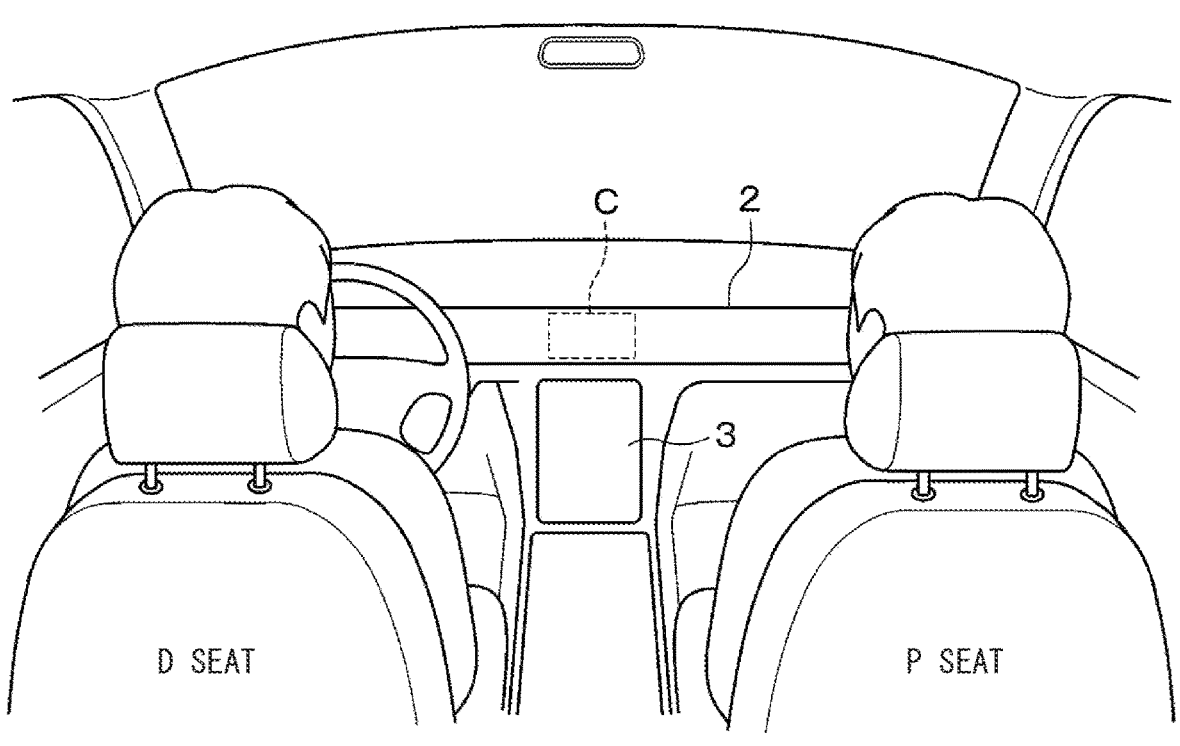
FIG. 9 is an explanatory diagram showing a display area that can be and visually recognized from the center in the cooperation manner in the vertical direction.

When none of the conditions are satisfied in S12 and S14, the display processing unit 13 displays the images at the positions that enable the recognition that images are vertically arranged from the viewpoint from the center in S16. That is, as shown in FIG. 9, the image contents are displayed at positions where they can be viewed vertically when viewed from the center.

For example, it is assumed that the operation panel 21 of the center display 3 is compatible with multi-tapping. In the assumed situation, the contents are positioned so as to be seen in the vertical direction from the D seat even when the occupant in the P seat operates the operation panel 21 while the driver sitting in the D seat is operating the operation panel 21. When the P seat occupant operates the operation panel 21 while the operation panel 21 is not being operated from the D seat, it is possible to display vertically the contents when viewed from the P seat. Further, when no one is operating the operation panel 21, it is possible to display the contents in the vertical direction when viewed from the center. When no one is operating the operation panel 21, the upper screen can be placed directly above the lower screen. Therefore, it becomes easier to view the contents on average for any occupant at any of seats including the back seat in the vehicle.

COMPARATIVE EXAMPLE

The D and P seats of a general vehicle are located leftward or rightward from the central portion of the cockpit system 4 in the vehicle. Therefore, for example, in a case of observing the plurality of displays 2 and 3 arranged vertically from the center front of the cockpit system 4, even if it seems that they are displayed in cooperation with each other in the vertical direction, the occupant cannot always observe, from the D seat or the P seat, the displays in the similar manner.

<Effect of Present Embodiment>

According to the present embodiment, the target person of the driver or the occupant of the P seat is selected, and the display processing unit 13 changes the display aspect of the information on the P-to-P display 2 and the center display 3 so that the target person can easily see it. Thereby, the occupant can grasp the cooperation display of the plurality of displays 2 and 3 arranged in the vertical direction without uncomfortable recognition.

Further, when, in a case of executing the navigation application, the display processing unit 13 displays the destination search screen on the two screens of the center display 3 and the P-to-P display 2 in the vertical direction, the operator detection unit 11d detects whether the operation was performed from the driver in the D seat or from the P seat. When it is determined that the operation was performed by the driver, the display processing unit 13 changes the display position of the information to be displayed on the P-to-P display 2 from the center to the position close to the P seat. When determining that the operation was performed from the P seat, the display processing unit 13 changes the display position of the information to be displayed on the display 2a of the P-to-P display 2 from the center to the position close to the D seat. Thereby, the recognition of the driver or the occupant in the P seat becomes easier.

Second Embodiment

Figure 10:
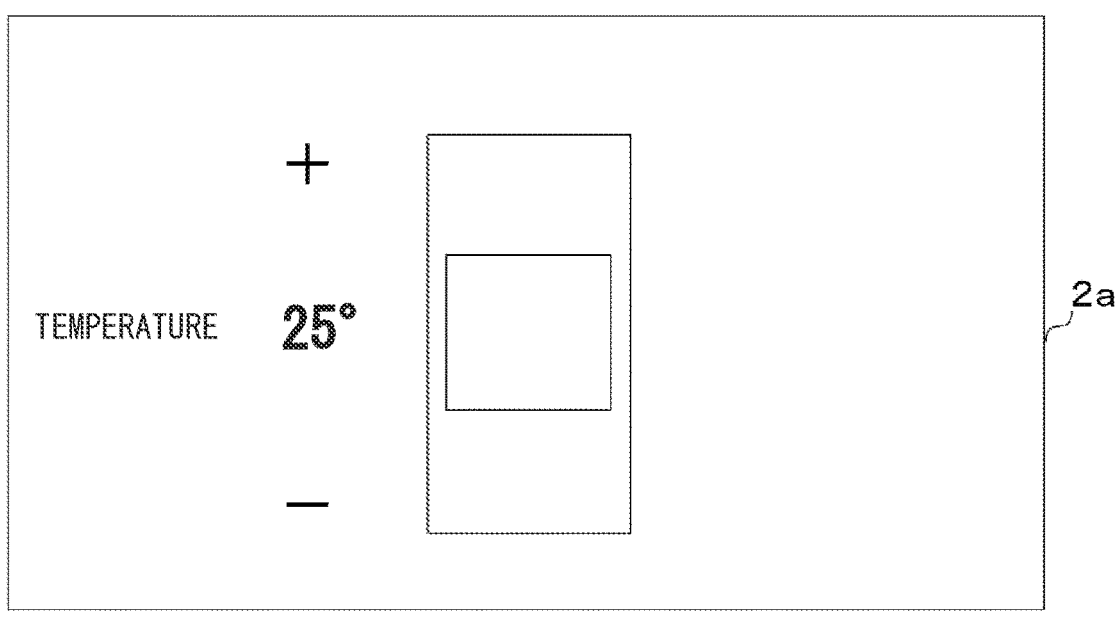
FIG. 10 is a diagram showing an example of image content to be displayed on the first display screen of the first display and the second display screen of the second display according to a second embodiment.
Figure 10:
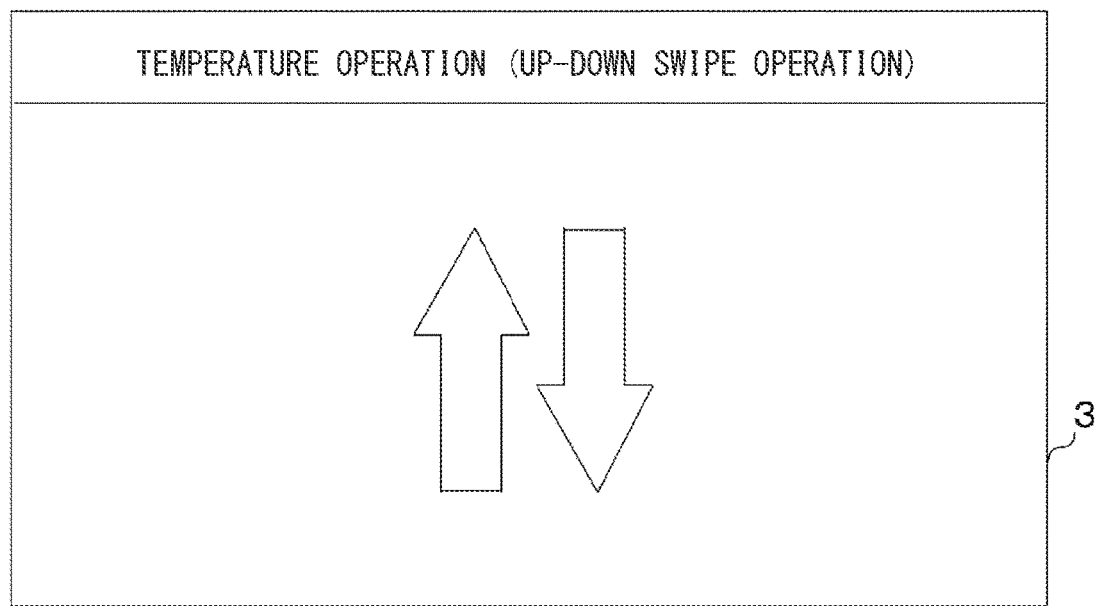

A second embodiment will be described with reference to FIGS. 10 and 11. In the present embodiment, the details of the operation when the temperature is increased or decreased by the air conditioner installed in the vehicle will be described. An application for an air conditioner function (hereinafter referred to as an air conditioner application) is installed in the storage 6, and the air conditioner function can be implemented by executing the air conditioner application. When the operation panel 21 receives a swipe operation, the control device 11 activates the shortcut function and activates the air conditioner application.

The operator performs an up-down swipe operation on the operation panel 21 installed on the center display 3 to use the shortcut function to issue an instruction to start changing the temperature of the air conditioner. As shown in FIG. 10, the control device 11 uses the air conditioner application to display the temperature adjustment status on a specific display 2a of the P-to-P display 2 and to display the operating method of the operation panel 21 on the center display 3.

Figure 11:
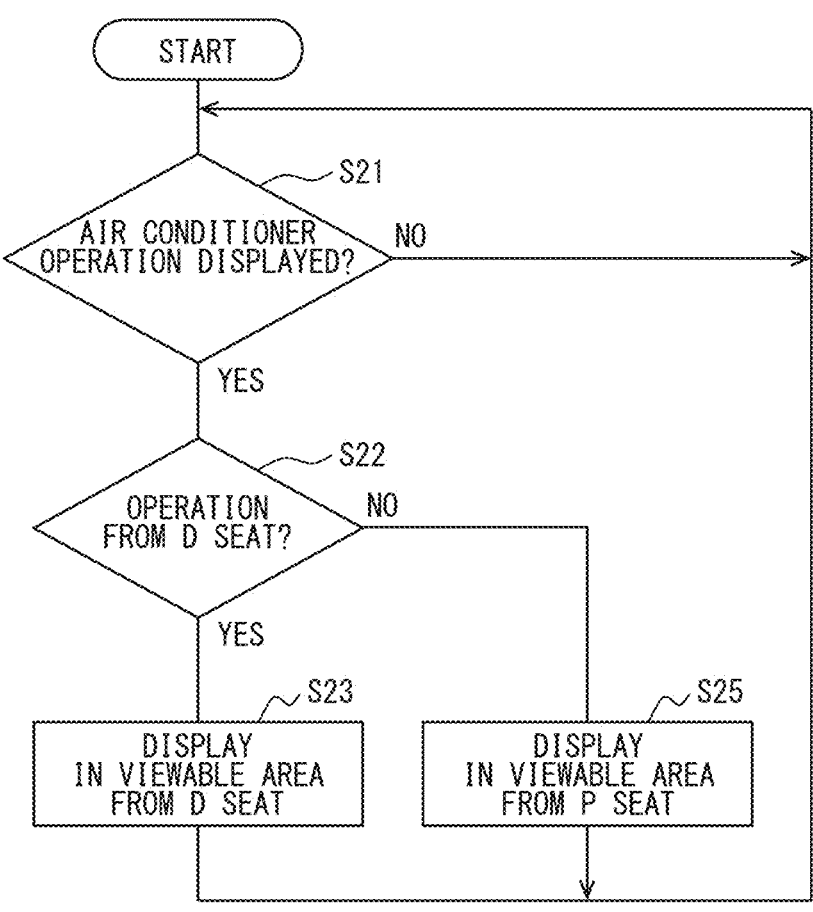
FIG. 11 is a flowchart schematically illustrating processes.

In a case of executing the air conditioner application, when displaying the air conditioner operation on the vertical two screens of the center display 3 and the P-to-P display 2 in S21 of FIG. 11, the control device 11 determines whether the operation is performed from the D seat in S22 of FIG. 11.

In the case of executing the navigation application by the control device 11, when the operation from the D seat is detected, the control device 11 determines that result is YES in S22 of FIG. 11. In S23, the display processing unit 13 displays the information at a position where information can be visually recognized from the viewpoint of the D seat when the information is provided to the D seat.

The display processing unit 13 moves the display to a position close to the P seat from the center in the P-to-P display 2 as shown by a display screen A of FIG. 7, when the display screen of the P-to-P display 2 is at the position closer to the vehicle exterior than the display screen of the center display 3. Thereby, the display processing unit 13 displays the image contents at positions that enable recognition of the vertically arranged image contents from the viewpoint from the D seat. When the driver sitting in the D seat is adjusting the temperature, the driver can easily confirm the operation result by displaying the operation result at the position close to the P seat.

Further, in the case of executing the navigation application by the control device 11, when the operation from the P seat is detected, the control device 11 determines that result is NO in S22. In S25, the display processing unit 13 displays the information at a position where information can be visually recognized from the viewpoint of the P seat when the information is provided to the P seat.

The display processing unit 13 moves the display to a position close to the D seat from the center in the P-to-P display 2 as shown by a display screen B of FIG. 8, when the display screen of the P-to-P display 2 is at the position closer to the vehicle exterior than the display screen of the center display 3. Thereby, the display processing unit 13 displays the image contents at a position that enables recognition of the vertically arranged image contents from the viewpoint from the P seat. When the occupant sitting in the P seat is adjusting the temperature, the occupant on the P seat can easily confirm the operation result by displaying the operation result at the position close to the D seat.

As described above, according to the present embodiment, the position of the content to be displayed on the P-to-P display 2 is changed depending on whether the operator of the air conditioner is the D seat driver or the P seat occupant. Thereby, it is possible to change the position of the content displayed on the P-to-P display 2 according to changes in the operator who operates the operation panel 21, and it is possible to achieve the same effects as those of the above-described embodiment.

When the temperature is adjusted, the result of the temperature adjustment is displayed not on the center display 3 but on the P-to-P display 2 close to the line of sight of the occupant while the occupant is seated. Thereby, the occupant can adjust the temperature without looking down. Since the driver can adjust the temperature without swinging, the operation by the driver becomes easier even while driving.

In the case of executing the air conditioner application, when, among the vertically arranged two screens of the P-to-P display 2 and the center display 3, the P-to-P display 2 shows the temperature adjustment status and the center display 3 shows an operation method of the temperature, the operator detection unit 11d detects whether the operation was performed from the driver in the D seat or the occupant in the P seat. Further, when the operator detection unit 11d determines that the operation was performed by the driver, the display processing unit 13 changes the display position of the temperature adjustment status to be displayed on the P-to-P display 2 from the center to the position close to the P seat. When the operator detection unit 11d determines that the operation was performed from the P seat, the display processing unit 13 changes the display position of the temperature adjustment status to be displayed on the P-to-P display 2 from the center to the position close to the D seat. Thereby, the recognition of the driver or the occupant in the P seat becomes easier.

Third Embodiment

Figure 12:
FIG. 12 is a diagram showing an example of image content to be displayed on the first display screen of the first display and the second display screen of the second display according to a third embodiment.
Figure 12:
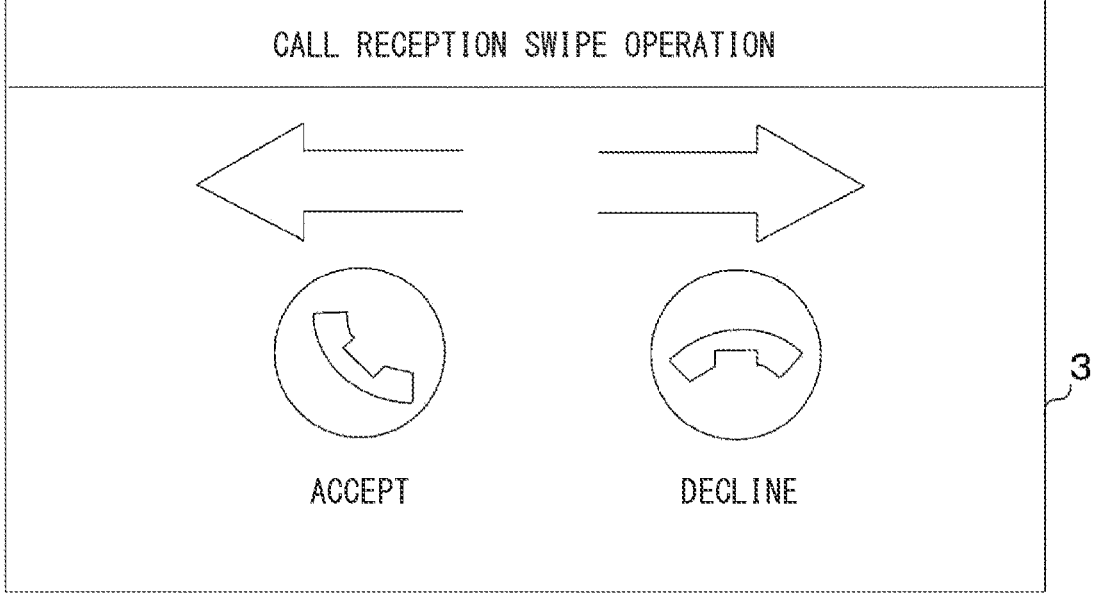

A third embodiment will be described with reference to FIGS. 12 and 13. In the present embodiment, control contents related to hands-free telephone will be described. An application of a hands-free phone application (hereinafter referred to as a telephone application) is installed in the storage 6, and the control device 11 executes the phone application to implement a hands-free phone function.

In the present embodiment, the driver and the occupant in the P seat have a mobile terminal 27 such as a smart phone or tablet compatible with short-range wireless communication such as so-called Bluetooth (registered trademark). When the vehicle engine starts, the telephone application is activated, and communication is established with the mobile terminal 27 in the vehicle through the wireless controller 16 by the short-range wireless communication. Further, when the telephone application is executed, the control device 11 communicates with the mobile terminal 27 in the vehicle, reads a telephone directory stored inside the mobile terminal 27, waits for an incoming call from a third party, or sends an outgoing call.

Figure 13:
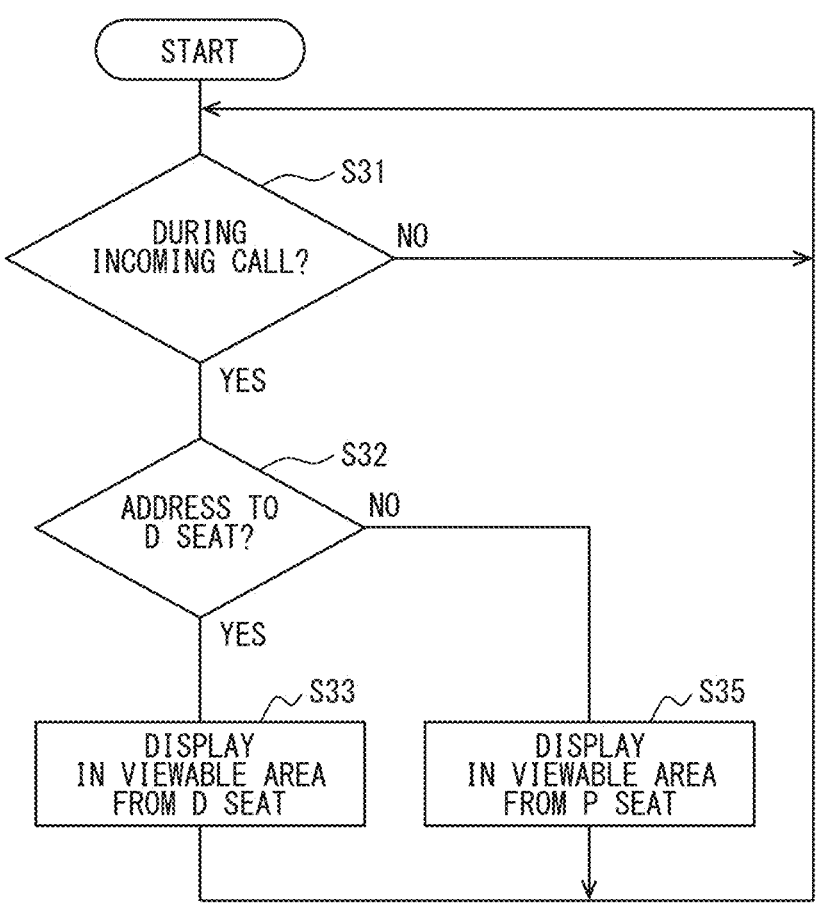
FIG. 13 is a flowchart schematically illustrating processes.

After that, in the case of executing the telephone application, it is determined whether the call is being received in S31 of FIG. 13. When the call is received from a third party, it is determined which person with the mobile terminal 27 in the vehicle is the incoming call target by communicating with the mobile terminal 27 in the vehicle with use of the short-range wireless communication and referring to the incoming phone number in S32. In S32, the telephone application determines whether the call is addressed to the mobile terminal 27 possessed by the driver in the D seat.

In the case of executing the telephone application, when the incoming call target detection unit 11e detects that the call is addressed to the mobile terminal 27 possessed by the driver in the D seat, the control device 11 determines that result is YES in S32. In S33, the display processing unit 13 displays the information at a position where information can be visually recognized from the viewpoint of the D seat when the information is provided to the driver in the D seat.

The display processing unit 13 moves the display to a position close to the P seat from the center in the P-to-P display 2 as shown by the display screen A of FIG. 7, when the display screen of the P-to-P display 2 is at the position closer to the vehicle exterior than the display screen of the center display 3. Thereby, the display processing unit 13 displays the incoming call screen at a position that enables recognition of the vertically arranged image contents from the viewpoint from the D seat.

When it is determined that the incoming call is addressed to the mobile terminal 27 possessed by the driver, the incoming call screen displayed on the P-to-P display 2 is displayed at a position close to the P seat with respect to the center, so that the driver can easily confirm the incoming call screen. When the incoming call screen can be confirmed on the P-to-P display 2, the driver can respond by performing the flick operation on the center display 3 without lowering the line of sight while keeping the line of sight directed forward. Thereby, the driver operation even during the driving becomes easier.

Further, in the case of executing the telephone application, when the incoming call target detection unit 11e detects that the call is addressed to the mobile terminal possessed by the occupant on the P seat, the control device 11 determines that result is NO in S32. In S35, the display processing unit 13 displays the information at a position where information can be visually recognized from the viewpoint of the P seat when the information is provided to the P seat. That is, the display processing unit 13 sets the display to a position close to the D seat from the center in the P-to-P display 2 as shown by a display screen B of FIG. 8, when the display screen of the P-to-P display 2 is at the position closer to the vehicle exterior than the display screen of the center display 3. Thereby, the display processing unit 13 displays the incoming call screens at a position that enables recognition of the vertically arranged the incoming call screens from the viewpoint from the P seat.

When the call is addressed to the occupant in the P seat, by displaying the incoming call screen at the position close to the D seat, the occupant in the P seat can easily confirm the operation result. When the operation panel 21 accepts a swipe operation after receiving the call, the telephone application can respond to the caller and start talking.

As described above, according to the present embodiment, when there is the incoming call, the position of the content to be displayed on the P-to-P display 2 is changed depending on whether the call is addressed to the mobile terminal possessed by the driver seated in the D seat, or the mobile terminal possessed by the occupant seated in the P seat. Thereby, the display position of the incoming call screen displayed on the P-to-P display 2 can be changed according to the change of the destination of the incoming call.

In the case of executing the hands-free telephone application, when the incoming call screens are displayed on the vertical two screens of the P-to-P display 2 and the center display 3 and the flick operation is accepted on the operation panel 21 provided on the center display 3, the incoming call target detection unit 11e detects the incoming call target person with the mobile terminal 27 from among the occupants in the vehicle at the time of receiving the call from the outside.

Then, when it is determined that the incoming call is addressed to the mobile terminal 27 possessed by the driver, the display processing unit 13 changes the display position of the incoming call screen to be displayed on the P-to-P display 2 to the position close to the P seat with respect to the center. Further, when it is detected that the incoming call is addressed to the mobile terminal 27 possessed by the occupant in the P seat, the display processing unit 13 changes the display position of the incoming call screen to be displayed on the P-to-P display 2 to the position close to the D seat with respect to the center. Therefore, the display position of the incoming call screen displayed on the P-to-P display 2 can be changed according to the change of the destination of the incoming call.

Fourth Embodiment

Figure 14:
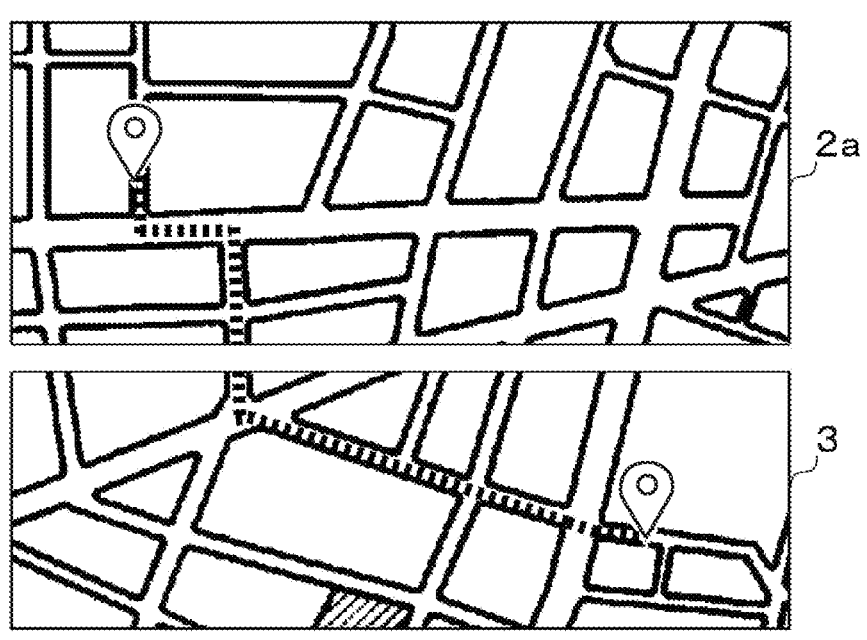
FIG. 14 is a diagram showing an example of image content to be displayed on the first display screen of the first display and the second display screen of the second display according to a fourth embodiment.

A fourth embodiment will be described with reference to FIGS. 14 and 15. In the present embodiment, the details of control when a large map image d is displayed on two vertical screens will be described. An application for a large map display function (hereinafter referred to as a large map display application) is installed in the storage 6. As shown in FIG. 14, the control device 11 executes the large map display application to implement a function of displaying the large map on two vertical screens of the center display 3 and the P-to-P display 2.

Figure 15:
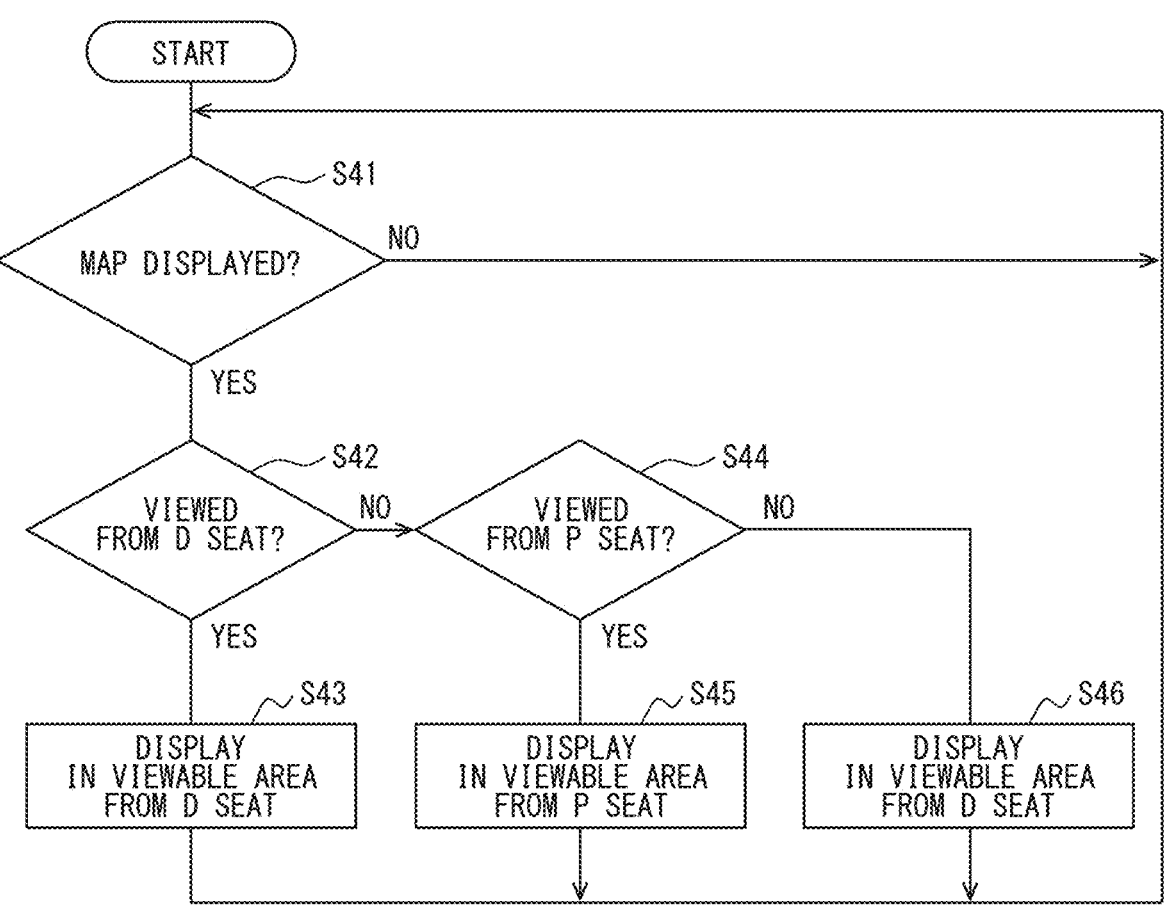
FIG. 15 is a flowchart schematically illustrating processes.

In a case of executing the large map application, when displaying the large map on the vertical two screens of the center display 3 and the P-to-P display 2 in S41 of FIG. 15, the control device 11 determines whether the recognition is being performed from the D seat or the P seat in S42 and S44.

In the case of executing the large map display application, when it is detected that the recognition is being performed from the D seat in S41 or when the operation from the D seat is detected, the control device 11 determines that the result is YES in 42 of FIG. 11. In S43, the display processing unit 13 displays the information at positions where information can be visually recognized from the viewpoint of the D seat when the information is provided to the D seat.

The display processing unit 13 sets the display to a position close to the P seat from the center in the P-to-P display 2 as shown by the display screen A of FIG. 7, when the display screen of the P-to-P display 2 is at the position closer to the vehicle exterior than the display screen of the center display 3. Thereby, the display processing unit 13 displays the large map at positions that enable the recognition of the vertically arranged image contents from the viewpoint from the D seat. Since the two screens of the P-to-P display 2 and the center display 3 are used to display the map of the periphery of the current position vertically, the driver in the D seat can check the wide-range map from a bird's-eye view and easily understand a guidance.

Further, in the case of executing the large map display application, when it is detected that the recognition is being performed from the P seat, when the operation from the P seat is detected, the control device 11 determines that result is YES in 44 of FIG. 15. In S45, the display processing unit 13 displays the information at positions where the information content can be visually recognized in an overlapping manner from the viewpoint of the occupant in the P seat when the information is provided to the occupant in the P seat. In the overlapping manner, the displayed contents are arranged so as to at least partially overlap in the upper-and-lower directions of the line of sight, the vertical direction, in the perpendicular plane. Thereby, it is possible to display continuously or relatively the contents with a sense of a unity when the occupant in the P seat visually recognizes the contents.

That is, the display processing unit 13 moves the display to a position close to the D seat from the center in the P-to-P display 2 as shown by the display screen B of FIG. 8, when the display screen of the P-to-P display 2 is at the position closer to the vehicle exterior than the display screen of the center display 3. Thereby, the display processing unit 13 displays the large map at positions that enable the recognition of the large map arranged in an overlapping manner from the viewpoint from the P seat. In the overlapping manner, the displayed contents are arranged so as to at least partially overlap in the upper-and-lower directions of the line of sight, the vertical direction, in the perpendicular plane. Thereby, it is possible to display continuously or relatively the contents with a sense of a unity when the occupant in the P seat visually recognizes the contents. Further, since the two screens of the P-to-P display 2 and the center display 3 are used to display the map of the periphery of the current position vertically, the occupant in the P seat can check the wide-range map from a bird's-eye view and easily understand a guidance.

When the driver is not visually recognizing the map and the P seat occupant is visually recognizing the map, by displaying the map on the screen of the P-to-P display 2 from the center to the position close to the D seat, it is possible to view the vertically connected maps from the P seat occupant. Therefore, it becomes easier to understand the maps.

If neither of the conditions is satisfied in S42 and S44, the large display application displays the maps in the overlapping manner according to the viewpoint from the D seat driver in S46. In the overlapping manner, the displayed contents are arranged so as to at least partially overlap in the upper-and-lower directions of the line of sight, the vertical direction, in the perpendicular plane. Since the map is basically content for the driver, it is preferable to make it easy for the driver sitting in the D seat to visually recognize the map. As the result, it is possible to display continuously or relatively the contents with a sense of a unity when the driver in the D seat visually recognizes the maps. Further, by shifting the map displayed on the P-to-P display 2 to the position close to the P seat, it becomes easier for the driver sitting in the D seat to view the maps since the driver seems to view the maps as if the maps are connected vertically, and the driver can easily check it. In addition, the driver can understand the geography situation of the peripheral of the current position in the bird's eye view manner. As shown in a display screen C of FIG. 9, the contents may be displayed so that the vertical recognition becomes easier when the contents are viewed from the center of the cockpit system 4.

For example, it is assumed that the operation panel 21 of the center display 3 is compatible with multi-tapping. In the assumed situation, it is possible to display the contents at the positions that enable the overlapping manner according to the viewpoint from the D seat even when the occupant in the P seat operates the operation panel 21 while the driver sitting in the D seat is operating the operation panel 21. In the overlapping manner, the displayed contents are arranged so as to at least partially overlap in the upper-and-lower directions of the line of sight, the vertical direction, in the perpendicular plane. Thereby, it is possible to display continuously or relatively the contents with a sense of a unity when the driver in the D seat visually recognizes the maps. In addition, when the occupant of the P seat operates the panel during no operation of the driver, it is possible to display the maps at the positions that enable the overlapping manner. In the overlapping manner, the maps are arranged so as to at least partially overlap in the upper-and-lower directions of the line of sight, the vertical direction, in the perpendicular plane. In this case, it is possible to display continuously or relatively the contents with a sense of a unity when the occupant in the P seat visually recognizes the contents. Further, the contents may be displayed as if the maps are vertically arranged in the perpendicular plane when viewed from the center, while no one operates the operation panel 21. When no one is operating the operation panel 21, the P-to-P display 2 can be placed directly above the screen of the center display 3. Therefore, it becomes easier to averagely confirm the large map regardless of the seat positions including the rear seat position in the vehicle when the occupant confirms the large map.

Basically, the priority is given to the driver, and it is desirable to maintain the display for the driver even when the occupant in the P seat views it while the driver is viewing it. Also, when the driver and the occupant in the front seat alternately view the screen for a short time, there is a risk that the display position of the screen will change frequently. However, in this case, the display processing unit 13 is preferable to fix the display position for a certain time so as not to change the display position. Thereby, it is possible to eliminate the annoyance.

As described above, according to the present embodiment, in the case of executing the application of the large map application, the large map is displayed and arranged in the vertical direction on the two vertical screens of the P-to-P display 2 and the center display 3. Then, when the viewer detection unit 11*c* detects that the driver is a visually recognizing person who visually recognizes the P-to-P display 2 and the center display 3, the display processing unit 13 shifts the display position to be displayed on the P-to-P display 2 from the center to the position close to the front passenger seat. Further, when the viewer detection unit 11*c* detects that the occupant in the passenger seat is a visually recognizing target person who visually recognizes the P-to-P display 2 and the center display 3, the display processing unit 13 shifts the display position to be displayed on the P-to-P display 2 from the center to the position close to the D seat. Thereby, the driver in the D seat and the occupant in the P seat become easier to confirm the large map.

Fifth Embodiment

Figure 16:
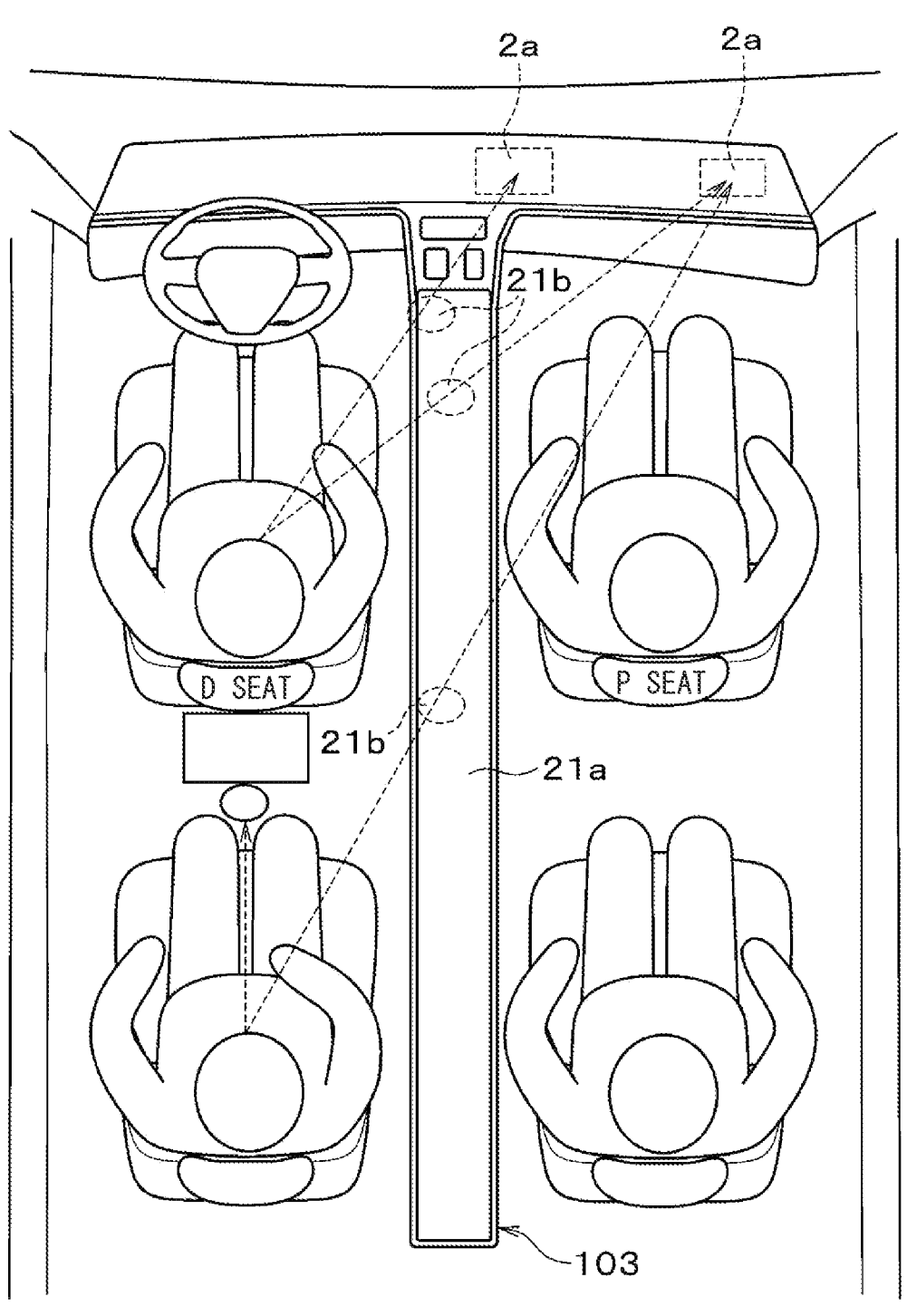
FIG. 16 is a diagram showing an installation environment of the display in a vehicle interior according to a fifth embodiment.

The fifth embodiment will be described with reference to FIG. 16. In this embodiment, as shown in FIG. 16, a vehicle interior display 103 is configured such that the display screen extends from between the front seats to between the rear seats in the vehicle.

A second operation panel 21*a* is laid on the vehicle interior display 103. Since the vehicle interior display 103 is configured in the center of the vehicle interior, it receives troublesome operations if the vehicle occupant accidentally touches it. The control device 11 of the present embodiment operates as an operation controller, and selectively controls an operation reception area 21*b* that receives the touch panel operation of the second operation panel 21*a* by the occupant without accepting such an operation.

When the operator detection unit 11*d* detects the operation area where the driver operates the second operation panel 21*a*, it is desirable that the display processing unit 13 displays the detected operation reception area 21*b* and the installation area of the P-to-P display 2 in the overlapping manner. In the overlapping manner, the detected operation reception area and the installation area at least partially overlap in the upper-and-lower directions. At this time, it is more desirable to execute the display process by changing the display aspect of the image content so that the display contents are displayed continuously or relatively with a sense of unity.

The display processing unit 13 is desirable to execute the display process so that the operation reception area 21*b* for receiving the touch panel operation of the second operation panel 21*a* and the display area of the image content on the display screen of the P-to-P display 2 at least partially overlap in the vertical direction of the line of sight of the target person. At this time, it is further desirable to change the display aspect of the P-to-P display 2 so that the display contents are displayed continuously or relatively with a sense of unity for the target person. Further, when a person is seated in the front seat or the rear seat, the display processing unit 13 is desirable to execute the display process so that the operation reception area 21*b* of the second operation panel 21*a* on the vehicle interior display 103 and the image content on the P-to-P display 2 at least partially overlap in the upper-and-lower direction of the line of the sight of the target person. At this time, it is further desirable to change the display aspect of the image contents or the operation reception area 21*b* so that the display content or the operation reception area 21*b* is displayed continuously or relatively with a sense of unity for the target person.

For example, as shown in FIG. 16, when the viewer detection unit 11*c* detects that the driver sitting in the D seat has viewed a specific display 2*a* of the P-to-P display 2, the control device 11 is desirable to execute the display process so that the operation reception area 21*b* and the installation area of the specific display 2*a* partially overlap in the upper-and-lower direction of the line of the sight of the driver. At this time, it is preferable to change and control the operation reception area 21*b* of the vehicle interior display 103 so that the display content can be confirmed by the driver who is the target person and is displayed continuously or relatively with a sense of unity.

Further, when the viewer detection unit 11*c* detects that the occupant in the rear seat has viewed a specific display 2*a* of the P-to-P display 2, the control device 11 is desirable to execute the display process so that the operation reception area 21*b* and the installation area of the specific display 2*a* at least partially overlap in the upper-and-lower direction of the line of the sight of the occupant in the rear seat. At this time, it is preferable to change and control the operation reception area 21*b* of the vehicle interior display 103 so that the contents can be confirmed by the occupant in the rear seat and are displayed continuously or relatively with a sense of unity.

At this time, when the hand of the occupant in the rear seat is detected by the viewer detection unit 11*c*, the control device 11 controls and changes the operation reception area 21*b* between the hand of the occupant in the rear seat and the specific display 2*a* so that the hand of the occupant in the rear seat reaches the operation reception area 21*b*. It is desirable to change and control the operation reception area 21*b* so that the image content and the operation reception area 21*b* partially overlap in the upper-and-lower direction of the line of sight of the occupant in the P seat or the rear seat. At this time, it is further desirable to change the display aspect of the image contents or the operation reception area 21*b* so that the display contents or the operation reception areas 21*b* are displayed continuously or relatively and provide a sense of unity even when the occupant in the P seat or the rear seat views the display contents. Thereby, it is possible to improve the convenience.

Other Embodiments

The present disclosure is not limited to the embodiments described above, but can be implemented by various modifications, and can be applied to various embodiments without departing from the spirit of the present disclosure. For example, the following modifications and extensions may be made.

Although the operation panel 21 provided on the display screen is used as the "operation unit", physical buttons may be used.

It is not always necessary to provide the operation panel 21 with a touch sensor on the display screen of the center display 3. Further, when the operation panel 21 is provided, the operation panel 21 may be provided on either of the upper and lower display screens. There may be no occupant in the P seat, and in this case, the display processing unit 13 should always facilitate the recognition from the D seat.

The display screen of the center display 3 may be installed so as to be located at the further outward position than the display screen of the P-to-P display 2. Here, the outward direction means that the display screen of the center display 3 is positioned close to the vehicle exterior with respect to the vehicle occupant such as the driver in the advancing direction, in other words, means that, in the advancing direction of the vehicle, the display screen of the center display 3 is in front of that of the P-to-P display 2. Further, although the display screen of the center display 3 is fixed and the position of the display screen of the P-to-P display 2 is changed, the position of the display screen of the center display 3 may be changed. Although the display screen of the P-to-P display 2 for the D seat and the display screen of the P-to-P display 2 for the P seat are switched to be used, the image contents for display may be displayed at the same time if they do not overlap.

In a case where a plurality of occupants operate the operation panel 21 and the operations are detected by the operator detection unit 11*d*, or a case where a plurality of occupants view the P-to-P display 2 and are detected by the viewer detection unit 11*c*, when the target selection unit 11*b* selects the plurality of target persons, the display position of the P-to-P display 2 may be changed arbitrarily. At this time, the display processing unit 13 may change the display aspect so that the information can be connected in the upper-and-lower direction from the center of the vehicle and visually recognized, or may be visually recognized by the plurality of target persons.

For example, when, while the operator detection unit 11*d* detects that the passenger sitting in the P seat has set a navigation destination or selected a menu, the viewer detection unit 11*c* detects that the driver in the D seat is visually confirming the P-to-P display 2, the position of the display screen of the image content in the P-to-P display 2 may be set to an arbitrary position.

Although the operation panel 21*a* is provided on the vehicle interior display 103 and the operation reception area 21*b* is controlled, the operation reception area 21*b* for receiving the operation of the operation panel 21 may be provided on the center display 3, or the P-to-P display 2.

The control device 11 and the method executed by the control device 11 described in the present disclosure may be implemented by a dedicated computer including a processor programmed to execute one or more functions embodied by a computer program and a memory. Alternatively, the control device 11 and the method according to the present disclosure may be achieved by a dedicated computer including a processor with one or more dedicated hardware logic circuits. Alternatively, the control device 11 and the method according to the present disclosure may be achieved using one or more dedicated computers including a combination of the processor and the memory programmed to execute one or more functions and the processor with one or more hardware logic circuits. The computer program may also be stored on a computer readable and non-transitory tangible recording medium as instructions executed by a computer.

In the drawings, the reference numeral of 1 indicates the vehicle display system, the reference numeral of 2 indicates the P-to-P display as a first display, the reference numeral of 2a indicates the display that constitutes the P-to-P display, the reference numeral of 3 indicates the center display as a second display, the reference numeral of 11b indicates the target selection unit, and the reference numeral of 11c indicates the viewer detection unit, the reference numeral of 11d indicates the operator detection unit, the reference numeral of 11e indicates the incoming call target detection unit, and the reference numeral of 13 indicates the display processing unit.

The present disclosure has been described in accordance with the embodiments. However, it is to be understood that the present disclosure is not limited to the embodiments and structure. The present disclosure covers various modification and equivalent arrangements. In addition, various combinations and modes, as well as other combinations and modes including only one element, more, or less, are within the scope and idea of the present disclosure.

The invention claimed is:

1. A vehicle display system for displaying information on a first display screen of a first display and a second display screen of a second display in a cooperation manner, wherein the first display and the second display are arranged vertically, the system comprising:
a target selection unit configured to select a target person who visually recognizes the first display screen and the second display screen among at least one occupant in a vehicle wherein the target person is a driver at a driver seat or a passenger at a passenger seat; and
a display processing unit configured to change a display aspect of the information on the first display screen or the second display screen for facilitating visual recognition, by the target person, of the information cooperatively displayed on the first display screen and the second display screen, wherein
the second display is placed between the driver seat and the passenger seat, the display aspect in a vertical direction in which the first display and the second display are arranged is an aspect in which the information on the first display and the information on the second display are arranged in an upper-and-lower direction of a line of sight of the target person,
the display processing unit is further configured to
move the first display screen or the second display screen that displays the information to change the display aspect of the information, by changing a display position of the information to be displayed on the first display screen to a position closer to the passenger seat relative to a center between the driver seat and the passenger seat when an operator detection unit has determined that the operation was performed by the driver at the driver seat, and
changing the display position of the information to be displayed on the first display screen to a position closer to the driver seat relative to the center when the operator detection unit has determined that the operation was performed by the passenger in the passenger seat,
the target selection unit is further configured to determine a direction of the line of sight of the target person,
when the determined direction is the upper-and-lower direction, the display processing unit moves a display position of the information displayed on the first display screen or the second display screen that displays the information, and
by displaying the information on the first display screen and the second display screen in the upper-and-lower direction, the display processing unit is further configured to provide a sense of unity when the at least one occupant in the vehicle visually recognizes a display content.

2. The vehicle display system according to claim 1, wherein
an operation panel is installed on the first display screen or the second display screen, and
the vehicle display system further includes an operation controller configured to move an operation reception area for receiving an operation on the operation panel based on the display aspect on the first display screen or the second display screen.

3. The vehicle display system according to claim 1, wherein
an operation panel is installed on the first display screen or the second display screen, and
the display processing unit changes the display aspect by setting the display aspect in which an operation reception area for receiving an operation of the occupant of the vehicle and an image content displayed on the first or second display screen are continuously or relatively displayed and provide a sense of unity when the occupant in the vehicle visually recognizes the operation reception area and the image content.

4. The vehicle display system according to claim 1, wherein
when the first display screen includes a plurality of displays that are arranged to be laterally long, the display processing unit selects and displays at least one of the plurality of displays.

5. The vehicle display system according to claim 1, wherein
the target selection unit includes a viewer detection unit configured to detect the target person that visually recognizes the first display screen and the second display screen among the occupant in the vehicle.

6. The vehicle display system according to claim 1, wherein
the target selection unit includes an operator detection unit configured to detect the target person that operates an operation portion among the occupant in the vehicle.

7. The vehicle display system according to claim 1, wherein the target selection unit includes an incoming call target detection unit configured to detect the target person of an incoming call to a mobile terminal among the occupant in the vehicle in response to a reception of the incoming call from an outside.

8. The vehicle display system according to claim 1, wherein
the display processing unit changes the display aspect of the information in the cooperation manner depending on the target person.

9. The vehicle display system according to claim 1, wherein
the display processing unit changes the display aspect by connecting the information vertically with respect to the target person for enabling visual recognition.

10. The vehicle display system according to claim 1, wherein
when the occupant of the vehicle includes a plurality of occupants and the target selection unit selects, as the target person, the plurality of occupants, the display processing unit changes the display aspect by connecting the information vertically from a center of the vehicle for enabling visual recognition.

11. The vehicle display system according to claim 1, wherein
when the occupant of the vehicle includes a plurality of occupants and the target selection unit selects, as the target person, the plurality of occupants, the display processing unit changes the display aspect to enable visual recognition of the plurality of occupants that are the target person.

12. The vehicle display system according to claim 1, wherein
even when the target person selected in the vehicle changes, the display processing unit fixes the display aspect and displays the information for at least a certain time.

13. The vehicle display system according to claim 1, wherein
when the first display screen includes a plurality of displays that are arranged to be laterally long, the vehicle display system includes, as the second display screen, a vehicle interior display that extends from between a plurality of front seats to between a plurality of rear seats in the vehicle, a second operation panel is installed on a display screen of the vehicle interior display, and
with respect to the target person sitting on at least one of the plurality of front seats or at least one of the plurality of rear seats, the display processing unit changes the display aspect by setting the display aspect in which an operation reception area by the second operation panel on the vehicle interior display and an image content displayed on the first display screen are continuously or relatively displayed and provide a sense of unity when the occupant in the vehicle visually recognizes the operation reception area and the image content.

14. The vehicle display system according to claim 1, wherein
the target selection unit includes the operator detection unit to determine whether an operation is performed by the driver on the driver seat or the passenger on the passenger seat, in a case of executing a navigation application, when a destination search screen is displayed on two vertically arranged screens of the first display screen and the second display screen.

15. The vehicle display system according to claim 1, wherein
by displaying the information on the first display screen and the second display screen in the upper-and-lower direction, the display processing unit is further configured to provide the sense of unity so that the target person is possible to recognize the display content while keeping the line of sight without lowering the line of sight.

16. The vehicle display system according to claim 1, wherein
by displaying the information on the first display screen and the second display screen in the upper-and-lower direction, the display processing unit is further configured to provide the sense of unity so that the line of sight in the upper-and-lower direction encompasses the information cooperatively displayed on the first display screen and the second display screen at a time after the display processing unit changes the display aspect.

17. A vehicle display system for displaying information on a first display screen of a first display and a second display screen of a second display in a cooperation manner, wherein the first display and the second display are arranged vertically, the system comprising:
a target selection unit configured to select a target person who visually recognizes the first display screen and the second display screen among at least one occupant in a vehicle; and
a display processing unit configured to change a display aspect of the information on the first display screen or the second display screen for facilitating visual recognition, by the target person, of the information cooperatively displayed on the first display screen and the second display screen, wherein
the target selection unit includes an operator detection unit configured to determine whether an operation is performed by a driver at the driver seat or a passenger at a passenger seat, in a case of executing an air conditioner application, when a temperature adjustment status is displayed on two vertically arranged screens of the first display screen and the second display screen and when a temperature operation method is displayed on the second display screen, and
the display processing unit
changes a display position of the temperature adjustment status to be displayed on the first display screen to a position closer to the passenger seat relative to a center between the driver seat and the passenger seat when the operator detection unit has determined that the operation was performed by the driver in the driver seat, and
changes the display position of the temperature adjustment status to be displayed on the first display screen to a position closer to the driver seat relative to the center when the operator detection unit has determined that the operation was performed by the passenger in the passenger seat.

18. A vehicle display system for displaying information on a first display screen of a first display and a second display screen of a second display in a cooperation manner, wherein the first display and the second display are arranged vertically, the system comprising:
a target selection unit configured to select a target person who visually recognizes the first display screen and the second display screen among at least one occupant in a vehicle; and a display processing unit configured to change a display aspect of the information on the first display screen or the second display screen for facilitating visual recognition, by the target person, of the information cooperatively displayed on the first display screen and the second display screen, wherein in a case of executing a hands free telephone application, when an incoming call screen is displayed on two vertically arranged screens of the first display screen and the second display screen and when an operation panel on the second display screen accepts a flick operation, the target selection unit includes an incoming call target detection unit configured to detect the target person of an incoming call to a mobile terminal among the occupant in the vehicle in response to a reception of the incoming call from an outside, the display processing unit changes a display position of the incoming call screen to be displayed on the first display screen to a position closer to a passenger seat relative to a center between a driver seat and the passenger seat when the incoming call target detection unit has determined that the incoming call is addressed to a mobile terminal possessed by a driver in the driver seat, and changes the display position of the incoming call screen to be displayed on the first display screen to a position closer to the driver seat relative to the center when the incoming call target detection unit has determined that the incoming call is addressed to a mobile terminal possessed by a passenger in the passenger seat.

19. A vehicle display system for displaying information on a first display screen of a first display and a second display screen of a second display in a cooperation manner, wherein the first display and the second display are arranged vertically, the system comprising:

a target selection unit configured to select a target person who visually recognizes the first display screen and the second display screen among at least one occupant in a vehicle; and a display processing unit configured to change a display aspect of the information on the first display screen or the second display screen for facilitating visual recognition, by the target person, of the information cooperatively displayed on the first display screen and the second display screen, wherein in a case of executing a large map application, when a large map is displayed on two vertically arranged screens of the first display screen and the second display screen, the target selection unit includes a viewer detection unit configured to detect the target person that visually recognizes the first display screen and the second display screen among the occupant in the vehicle, and the display processing unit changes a display position of the large map to be displayed on the first display screen to a position closer to a passenger seat relative to a center between a driver seat and the passenger seat when the viewer detection unit has detected a driver in the driver seat as a visually recognizing target person who has visually recognized the first display screen and the second display screen, changes the display position of the large map to be displayed on the first display screen to a position closer to the driver seat relative to the center when the viewer detection unit has detected a passenger in the passenger seat as the visually recognizing target person who has visually recognized the first display screen and the second display screen.

20. A vehicle display method for displaying information on a first display screen of a first display and a second display screen of a second display in a cooperation manner, wherein the first display and the second display are arranged vertically, the method comprising:

selecting a target person who visually recognizes the first display screen and the second display screen among at least one occupant in a vehicle wherein the target person is a driver in a driver seat or a passenger in a passenger seat; and changing a display aspect of the information on the first display screen or the second display screen for facilitating visual recognition, by the target person, of the information cooperatively displayed on the first display screen and the second display screen, wherein the second display is placed between a driver seat and a passenger seat, the display aspect in a vertical direction in which the first display and the second display are arranged is an aspect in which the information on the first display and the information on the second display are arranged in an upper-and-lower direction of a line of sight of the target person, the vehicle display method further comprising:

moving the first display screen or the second display screen that displays the information to change the display aspect of the information, by changing a display position of the information to be displayed on the first display screen to a position closer to the passenger seat relative to a center between the driver seat and the passenger seat when the operator detection unit has determined that the operation was performed by the drive in the driver seat;

changing the display position of the information to be displayed on the first display screen to a position closer to the driver seat relative to the center when the operator detection unit has determined that the operation was performed by the passenger in the passenger seat; and determining a direction of the line of sight of the target person, when the determined direction is the upper-and-lower direction, a display position of the information on the first display screen or the second display screen that displays the information is moved, and by displaying the information on the first display screen and the second display screen in the upper-and-lower direction, a sense of unity is provided when the at least one occupant in the vehicle visually recognizes a display content.

21. A computer-readable non-transitory storage medium storing a vehicle display program for displaying information on a first display screen of a first display and a second display screen of a second display in a cooperation manner, wherein the first display and the second display are arranged vertically, the program being configured to cause a processor of a vehicle device to:

select a target person who visually recognizes the first display screen and the second display screen among at least one occupant in a vehicle wherein the target person is a driver in a driver seat or a passenger in a passenger seat; and change a display aspect of the information on the first display screen or the second display screen for facilitating visual recognition, by the target person, of the information cooperatively displayed on the first display screen and the second display screen, wherein the second display is placed between a driver seat and a passenger seat, the display aspect in a vertical direction in which the first display and the second display are arranged is an aspect in which the information on the first display and the information on the second display are arranged in an upper-and-lower direction of a line of sight of the target person, the program being further configured to cause the processor of the vehicle device to:

move the first display screen or the second display screen that displays the information to change the display aspect of the information, by changing a display position of the information to be displayed on the first display screen to a position closer to the passenger seat relative to a center between the driver seat and the passenger seat when the operator detection unit has determined that the operation was performed by the driver in the driver seat, changing the display position of the information to be displayed on the first display screen to a position closer to a driver seat relative to the center when the operator detection unit has determined that the operation was performed by the passenger in the passenger seat, and determine a direction of the line of sight of the target person, when the determined direction is the upper-and-lower direction, a display position of the information on the first display screen or the second display screen that displays the information is moved, and by displaying the information on the first display screen and the second display screen in the upper-and-lower direction, a sense of unity is provided when the at least one occupant in the vehicle visually recognizes a display content.

* * * * *